United States Patent [19]
Maus et al.

[11] Patent Number: 5,718,849
[45] Date of Patent: Feb. 17, 1998

[54] METHOD AND APPARATUS FOR INJECTION-COMPRESSION MOLDING & EJECTING PAIRED THERMOPLASTIC SPECTACLE LENS SUITED FOR FULLY AUTOMATED DIP HARDCOATING

[75] Inventors: Steven M. Maus, Osseo; George J. Galic, Columbia Heights, both of Minn.

[73] Assignee: Galic Maus Ventures, Columbia Heights, Minn.

[21] Appl. No.: 533,126

[22] Filed: Sep. 25, 1995

[51] Int. Cl.$^6$ .................................................. B29D 11/00
[52] U.S. Cl. ........................... 264/2.2; 264/2.3; 264/334; 264/335; 425/73; 425/808; 427/164
[58] Field of Search ..................... 264/2.2, 1.1, 2.3, 264/334, 335; 425/808, 73; 427/162, 164

[56] References Cited

U.S. PATENT DOCUMENTS

| | | |
|---|---|---|
| 3,956,540 | 5/1976 | Laliberte . |
| 4,008,031 | 2/1977 | Weber . |
| 4,036,168 | 7/1977 | Laliberte . |
| 4,364,878 | 12/1982 | Laliberte . |
| 4,438,159 | 3/1984 | Weber . |
| 4,664,854 | 5/1987 | Bakalar . |
| 4,793,953 | 12/1988 | Maus . |
| 4,828,769 | 5/1989 | Maus . |
| 4,836,960 | 6/1989 | Spector . |
| 4,900,242 | 2/1990 | Maus . |
| 4,933,119 | 6/1990 | Weymouth, Jr. . |
| 4,965,028 | 10/1990 | Maus . |
| 4,981,634 | 1/1991 | Maus et al. ............ 264/335 |
| 5,093,049 | 3/1992 | Uehara . |
| 5,376,317 | 12/1994 | Maus . |
| 5,539,971 | 7/1996 | Kelly ................. 264/1.1 |

FOREIGN PATENT DOCUMENTS 2159441  12/1985  United Kingdom .

OTHER PUBLICATIONS

"Processing Guide: Injection Compression Molding" by Doug Smock in *Plastics World* Magazine, Sep. 1995, pp. 31-36.

*Primary Examiner*—Mathieu D. Vargot

[57] ABSTRACT

Plastic injection-compression multi-cavity molding of flash-free improved-cleanliness thermoplastic spectacle lenses are suitable to be robotically dip hardcoated. Special spring-loaded molds having variable-volume mold cavities are used in an injection-compression molding process to form, without parting line flash, pairs of a wide range of differing optical power of polycarbonate Rx spectacle lenses. These pairs have special molded-on design features which are specially suited for full automation, starting with a novel way for ejection out of the mold into a takeout robot which is integrated via full automation with subsequent dip hardcoating. A molded-on tab with each pair of lenses is specially suited for manipulation by SCARA type robot. This combination produces micro-clean hardcoated paired molded lens made entirely within a single continuous cleanroom air enclosure surrounding the lenses, without any human operators therein, nor requiring any cutting or trimming of the molded paired lens or runner system before hardcoating, nor use of Freon (tm) CFC nor aqueous cleaning protocols before dipcoating. An extension of this cleanroom enclosure and robotic handling scheme may optionally provide in-line continuous-product-flow automatic inspection of optical power and lens cosmetic quality, and/or may optionally provide in-line continuous-product-flow anti-reflective thin film vacuum coating, before the molded-and-hardcoated polycarbonate lenses exit out of the continuous cleanroom air enclosure and/or receive any manual handling.

7 Claims, 8 Drawing Sheets

Comparative Example

Comparative Example

Comparative Example

Comparative Example

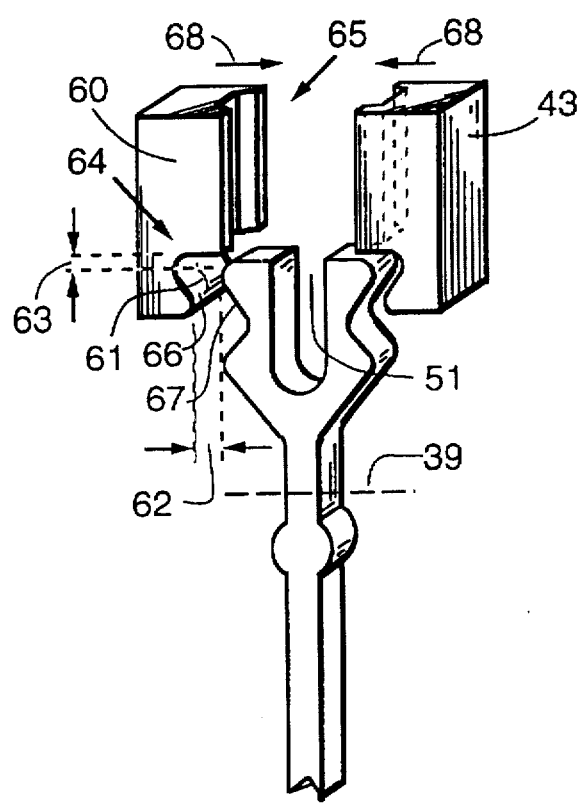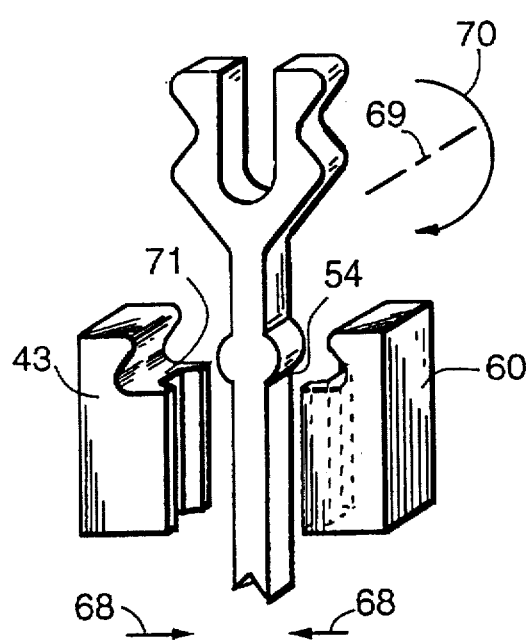
FIG. 3C
FIG. 3D

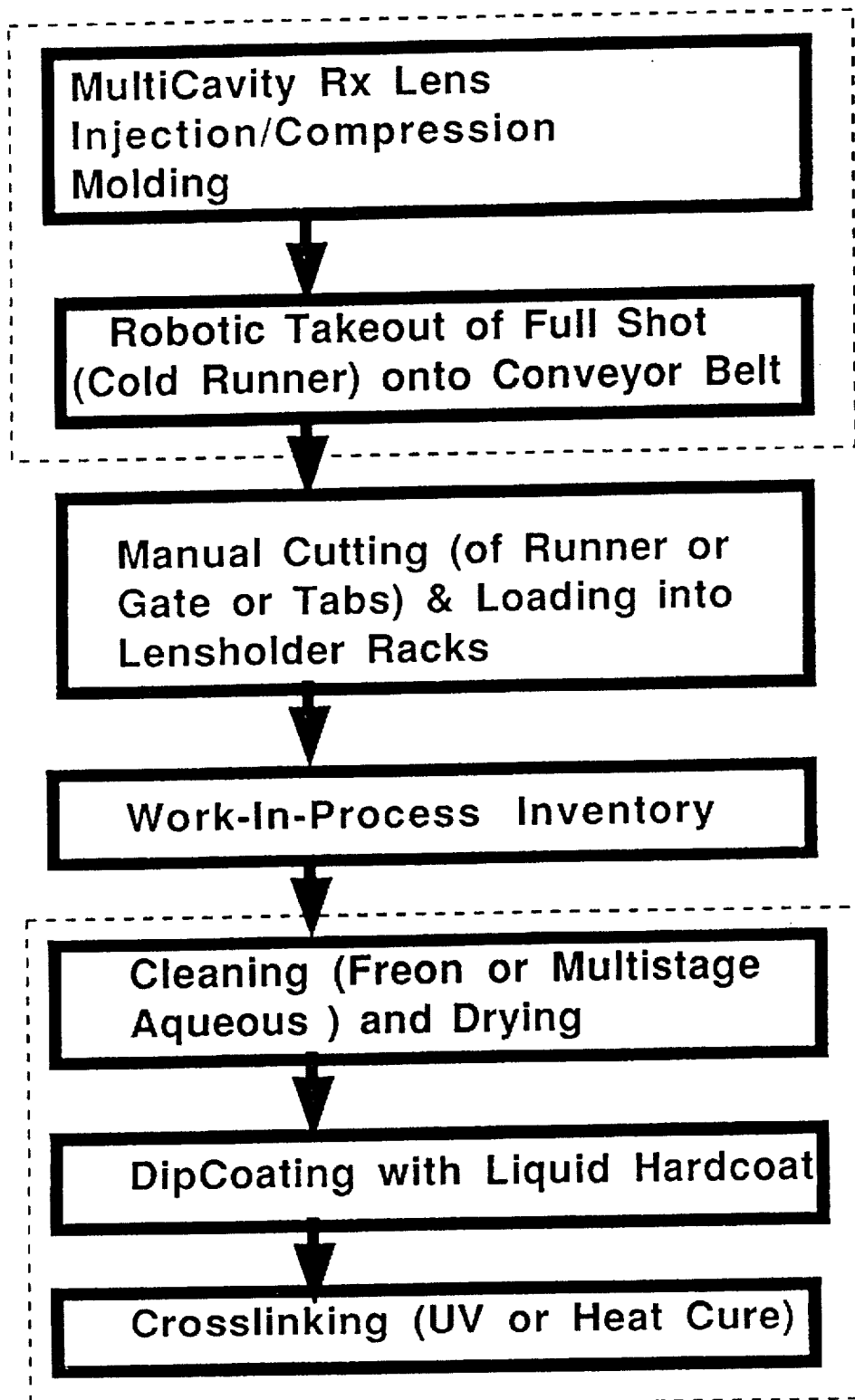
Figure 4A: Comparative Example ("Batch Process")

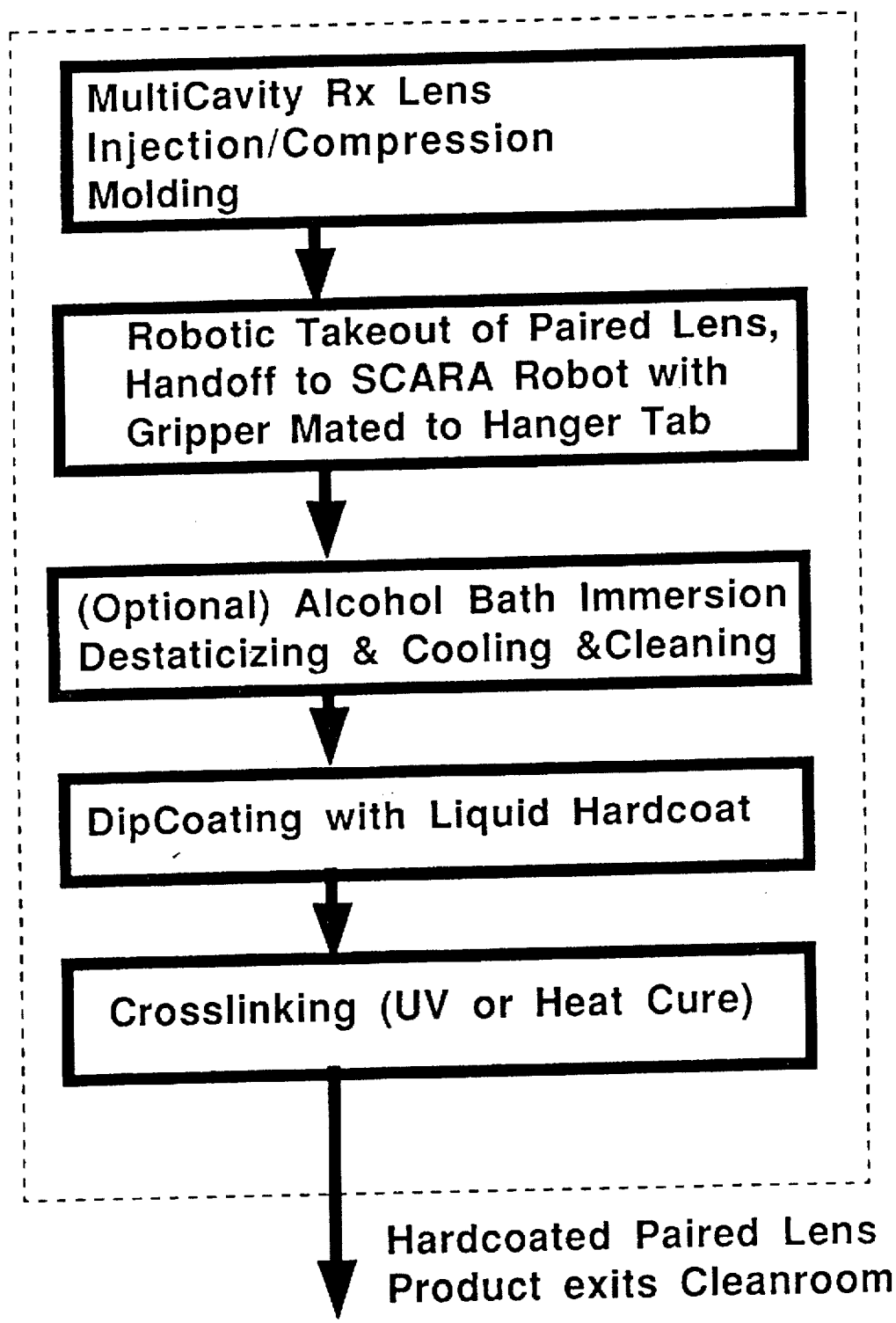
Figure 4B: Automated "Mold and Dipcoat" ("Continuous Process")

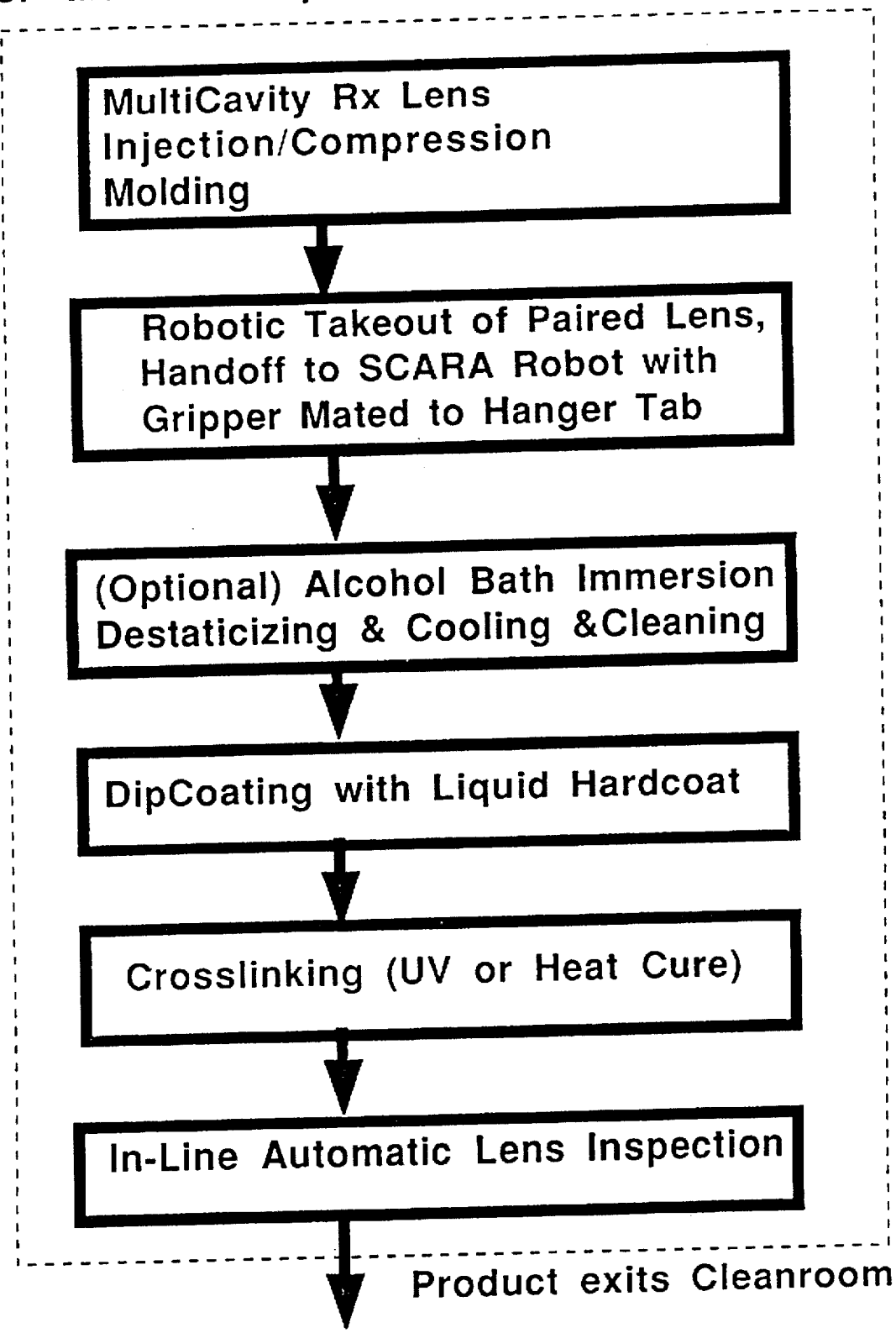
Figure 4C: In-Line Automated Inspection of "Mold and Dipcoat" ("Continuous Process")

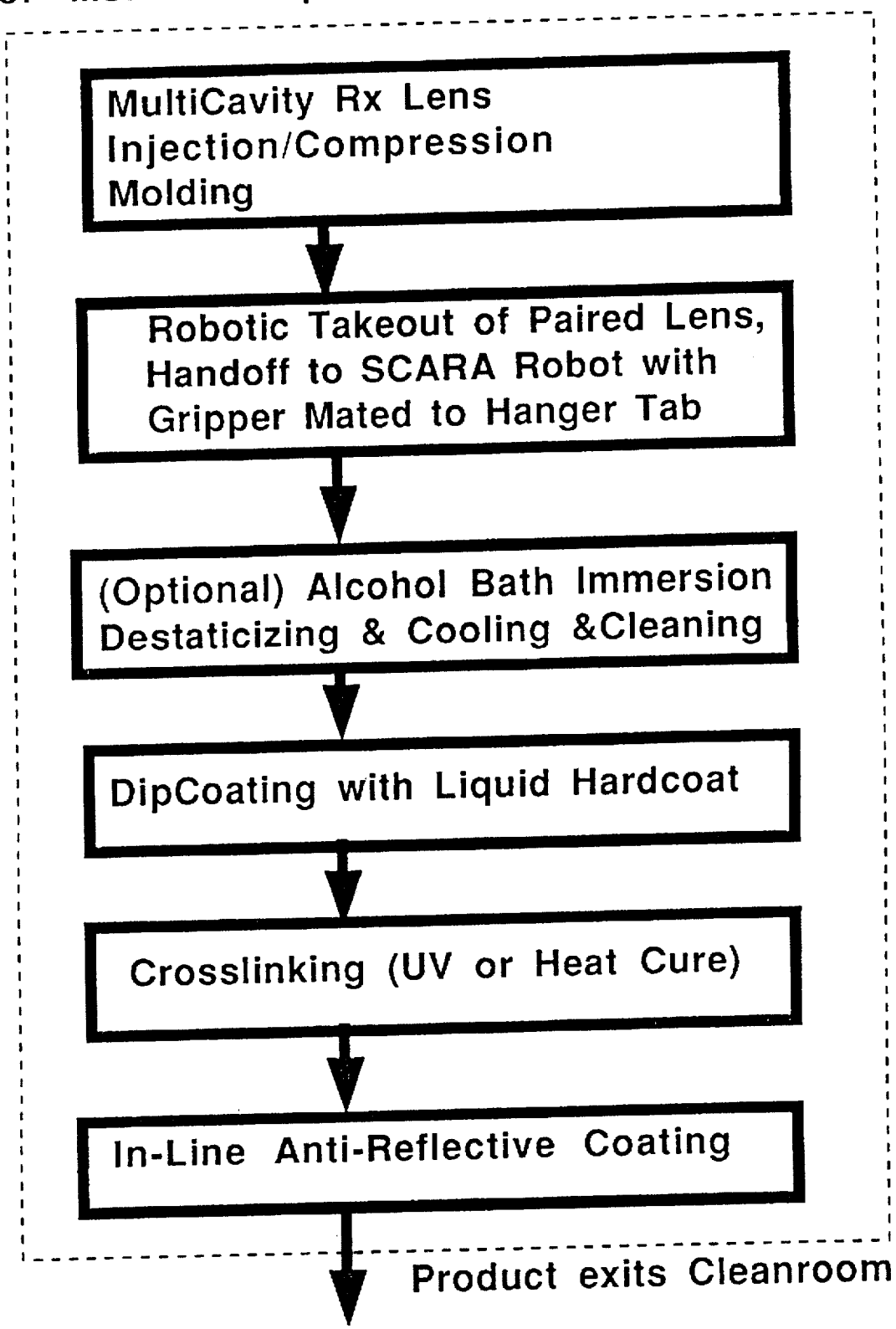
Figure 4D: In-Line Automated AR Vacuum Coat of "Mold and Dipcoat" ("Continuous Process")

5,718,849

METHOD AND APPARATUS FOR INJECTION-COMPRESSION MOLDING & EJECTING PAIRED THERMOPLASTIC SPECTACLE LENS SUITED FOR FULLY AUTOMATED DIP HARDCOATING

1. FIELD OF THE INVENTION

The field of the present invention is plastic injection—compression molding of pairs of flash-free improved-cleanliness thermoplastic spectacle lens, to be fed into subsequent in-line dip hardcoating. More specifically, a method and apparatus for multi-cavity injection molding of polycarbonate spectacle lens is integrated via full automation with dip hardcoating, to produce clean hardcoated molded lens made entirely within a single continuous cleanroom air enclosure surrounding the lenses, without any human operators therein, nor requiring any cutting or trimming of the molded paired lens or runner system before hardcoating, nor use of Freon (tm) CFC nor aqueous cleaning protocols before dipcoating. An extension of this cleanroom enclosure and robotic handling may optionally provide in-line continuous-product-flow automatic inspection of optical power and lens cosmetic quality, and/or may optionally provide in-line continuous-product-flow anti-reflective thin film vacuum coating, before the molded-and-hardcoated polycarbonate lenses exit out of the continuous cleanroom air enclosure and/or receive manual handling.

2. BACKGROUND OF THE INVENTION

A. Rx Lens Market Trend to Polycarbonate

The relevant product field is vision-corrective plastic ophthalmic prescription spectacle lens (hereinafter abbreviated "Rx lens") having refractive index greater than 1.530 glass and 1.49–1.50 "CR-39" (chemically, peroxide-crosslinked allyl diglycol carbonate thermoset-cast lens). This is the fastest growing category of Rx lens materials in the last five years, both in U.S. and worldwide markets. Such cast thermoset and injection-molded thermoplastics are so highly desirable because the consumer/wearer of spectacle lens finds them to be thinner (due to greater light-bending power of high-refractive-index plastic) and lighter (lower specific gravity, particularly in the case of polycarbonate versus CR-39). As a result, the myopic ("near-sighted") spectacle lens wearer can avoid the cosmetically undesirable appearance of "wearing coke-bottle glasses". In addition, lighter weight means better comfort, less weight, less pinching at the nose and top of ears, where the loadbearing surfaces are.

Within this "thin & light", higher-refractive-index plastic Rx lens segment, U.S. market statistics show a combined share of 25–30% of the total market. However, within this segment, the thermoset cast high-index share has been essentially unchanged since 1991; nearly all this growth in recent years is of the thermoplastic injection-molded Rx lens type, most specifically embodied by polycarbonate (R.I.= 1.586). (Although there are other candidate high-index thermoplastics also being considered, so far polycarbonate is most firmly established commercially—hereinafter, "polycarbonate" will be taken to be inclusive of other optical-grade thermoplastic substitutes, as would be obvious to those skilled in the art).

The major reason for market share shift toward polycarbonate Rx lens and away from cast thermoset high index Rx lens is reported to be the considerably lower manufacturing costs of polycarbonate Rx lens at high production volume levels. This, in turn, is from the high levels of automation attainable with polycarbonate, but inherently not attainable with the more labor-intensive thermoset casting operations. At low-volume percent utilization, highly automated production can be burdened with extremely high fixed cost, but as volume increases past "breakeven" levels, there is a cross-over point where the relatively higher variable-cost inputs of labor and materials inherent to thermoset casting becomes very disadvantageous. Thereafter, with increasing volume, the incremental profit per unit of increased volume becomes highly leveraged in favor of the more automated (polycarbonate) manufacturing operation.

This is reflected in market pricing from the lens manufacturers, wherein the cast high-index hardcoated Rx lenses are far from being price-competitive with corresponding prescriptions of the multi-cavity injection-molded, hardcoated polycarbonate Rx lenses (especially, finished single vision ("FSV") types which have higher unit sales volumes per Rx). The cast high-index FSV can be typically 50–100%; higher priced. It is for these reasons why a further level of manufacturing cost reduction, through even greater level of automation and through improved capital efficiency (=lower breakeven volume, which reduces capital requirements for new manufacturing entries into the field) will be strategically crucial in the polycarbonate Rx lens' future growth.

B. Prior Art Patents on Multi-Cavity Lens Molding and Dip Hardcoating

Today, polycarbonate Rx lens worldwide production is dominated by four companies, together comprising an estimated greater-than-90% share of world market (although there are new entries just starting up). Each of these four currently employ some form of injection-compression multi-cavity molding process and apparatus, at the start of their "batch process" manufacturing flowsheet (see FIG. 4A Comparative Example). The next step is post-molding cutting of runner system and/or degating or trimming off ejector tabs, so the trimmed lenses can be mounted into a lensholder rack. Typically, these are semi-automatic operations assisted by a human operator, but they can also be entirely manual operations. An example of a molded-on hanger tab which is fitted to engage a lensholder rack holding a plurality of such lenses is shown in Weber (U.S. Pat. No. 4,443,159). The next step in the manufacturing flowsheet is to use some form of cleaning protocol (earlier versions were all Freon (tm) CFC ultrasonic vapor degreaser methodologies; more recently, water-based cleaning is aqueous high-pressure sprays with centrifugal spinning, or multi-stage ultrasonic tank immersions, followed by drying operations). These cleaned and dried lenses are then dipcoated in liquid hardcoating solutions (either heat-curing silicone types or UV-curing types), and the coating is cured by chemical crosslinking.

Two of the above-mentioned four polycarbonate Rx lens manufacturers are licensees of Applicants' U.S. Pat. No. 4,828,769 and U.S. Pat. No. 4,900,242. A third is Gentex Corporation, assignee of Weymouth (U.S. Pat. No. 4,933,119). A fourth is Neolens, assignee of Bakalar (U.S. Pat. No. 4,664,854). These patents employ some form of injection-compression molding process sequence with a plurality of mold cavities and employing various means for achieving cavity-to-cavity balance therebetween. These three patents employed by four manufacturers differ in how the molded lens is ejected out of the lens mold, as can be easily seen by observing the O.D.-perimeter lens edge & sidewall of a sample lens from each manufacturer. More on this later in FIG. 2 and its descriptive text. All three necessarily do at least some cutting before dipcoating is possible.

Looking at other prior art patents showing multicavity injection-compression molding of Rx lens, Weber (U.S. Pat. No. 4,008,031) apparatus for injection-compression molding of Rx lens shows what appears to be a two-cavity mold. At 180 degrees opposite the gate inlet 23 is a hanger 20 for use in subsequent dipcoating operations. Weber also shows two molded-on ejector tabs 16, located at about 10:30–1:00 o'clock positions, with respect to the gate/dripmark location at 6:00 o'clock. Normally, this location would have the detrimental effect of propagating coating flowout runs along the front and back faces of the molded lens during dipcoating withdrawal, but in Weber's case, he has installed the hanger tab and ejector tabs onto a circumferential flange 12, which is set back from both the front and back lens edges, such that coating flow runoff could then follow this flange from top to bottom of each individually-held lens (provided the lens don't swing from side to side).

Uehara et al (U.S. Pat. No. 5,093,049) also teaches and shows injection-compression molding of Rx lens in a two-cavity mold, with the cavities connected by a cold runner and sprue, with the sprue being able to be mechanically shut off at a predetermined time in the cycle, to prevent backflow. Uehara is silent on any ejection means for demolding these two lenses and no ejector tabs or pins are shown. If the forward travel of the movable cores, which provide the compression, is limited by hard stops, they cannot be used to drive forward past the parting line once the mold is open, to assist ejection. In that case, a human operator would be relied upon to manually grasp the cold sprue and pull loose the two lenses attached thereto from the mold. No hanger tab is shown or mentioned.

Other historically important injection-compression molding of Rx lenses includes Spector et al (U.S. Pat. No. 4,836,960) and Laliberte (U.S. Pat. No. 4,364,878), but both of these are limited to single-cavity embodiments.

Looking now at Rx lens dipcoating prior art patents (in addition to previously-cited Weber (U.S. Pat. No. 4,443,159), Laliberte (U.S. Pat. No. 3,956,540 Method and U.S. Pat. No. 4,036,168 Apparatus) teaches a form of conveyorized transfer of such lensholder racks through a multi-station machine internally having a filtered-air cleanroom environment, wherein the lenses are successively ultrasonically cleaned and destatisized, then dipcoated, then dried and at least partially cured to a tackfree state before the conveyor takes them to a loading/unloading station, where the lenses can be removed by the operator. Similar configurations were developed using different automated transfer means, including two chain-drive conveyors operating in parallel and connected by crossbars whereon the lensholder racks would be hung, or, alternatively, an overhead conveyor with power and free flights for indexing could be used, with suspended removable lensholder racks mounted thereon. Such configurations for polycarbonate Rx lenses (and non-Rx lenses) typically used at least one (preferably, two, in series dips) Freon ultrasonic cleaner/degreasers, wherein the polycarbonate lenses were immersed in the ultrasonic sump for a prescribed time, during which cavitation (generation and collapse of microscopic bubbles) provides high kinetic energy working synergistically with the Freon's solvency (to reduce adherent films holding onto the soils on the lens surface), to thus dislodge and float away surface contaminants of both soluable and insoluable types. After lens removal from the ultrasonic sump solution, an azeotropic freon/alcohol vapor zone would help rinse and dry the lens before going into the dipcoating tank.

Liebler et al, UK Patent Application GB2 159 441 A, published 4 Dec., 1985; assignee: Rohm GmbH) also teaches continuous dip production of scratch-resistant liquid coatings onto plastic optical moldings (such as lenses). It specifically teaches an endless conveyor belt to transfer lensholder racks containing a plurality of lenses. Among the optical plastic moldings contemplated are spectacle lense, and FIG. 2 shows a molding with a "lug 10 for clamping purposes is formed thereon and diametrically opposite this lugged end is a dripoff lug 11, so that excessive scratch-resistant coating composition can drip off without forming a ridge when coated and dried." (Lines 97–105). In comparison to Laliberte, thin machine is far simpler, contemplating merely a load/unload, a liquid dipcoating station, and a drying station shown (described as, "preferably, two or more infrared radiators". Not shown but mentioned in text is . . . "cleansing bath may also be provided upstream of the immersion bath. The cleansing bath may, for example, be an ultrasonic bath containing organic solvent". (Lines 122–128). However, Liebler is believed not to have ever been actually used for spectacle lens coating nor Rx lens coating. There are major technical problems unforeseen by Liebler. His FIG. 2 lens with diametrically-opposed hanger tab and drip tab would inevitably have coating flowout runs propagated from the two junctions of the coating tab, at its shoulders. Unfortunately, these runs take place in the very worst location of the perimeter, since the coating flow runs will go directly through the central, most critical zone of the optics for vision (see Comparative Example FIG. 2D). To the extent that the Liebler apparatus might be acceptable, it would not be believed to be spectacle lenses, but rather ordinary protective-covering lenses such as watch glasses, scales, and mirrors, none of which are required to have the high quality of image transmission that corrective-vision spectacle lenses must have. Where the hardcoating merely is to protect from heavy scratching and the protective-covering lens is merely to provide some transparency to a product or device, such flow runs may be harmless and not a functional problem. However, for spectacle lenses with human vision problems resulting from optical aberrations, such coating flow runs would be completely unacceptable and the source of very high percent rejectable flaws. If such tab configurations are as shown, of the full thickness of the lens, holding, then such a problem would be absolutely intrinsic. However, if the tab is not of the full thickness of the lens, as shown in the Weber drawings, but merely thick enough to support the relatively light weight of the lens suspended thereby, then such a tab location would be acceptable, but only if the lens is held level in its mount, not rocking back and forth, which would be a another problem envisioned with Liebler's "endless conveyor".

C. Environmental and Economic Problems with Lens Cleaning

"Freon" cleaning is based upon now-unacceptable CFC-113 (ozone-depleting), production of which theoretically ceased on Dec. 31st, 1994, in accordance with the Montreal protocol and its EU revisions, As a result, new Rx lens installations necessarily have substituted aqueous cleaning approaches instead. One such approach employs high-pressure (up to 20,000 psi) jets of water spray to which are scanned across the front and back surfaces of the lens, by moving the lens (such as spinning it on a spindle) or by moving the spray head (such as by reciprocating motion) or preferably, a combination of both. High-pressure water spray is very effective in removing insoluble particulate forms of surface contamination (such as electrostatically-held polycarbonate dust particles or airborne inorganic dusts) but has the drawback that such cleaning is 100% "line of sight", so not only must lenses typically be cleaned one at a time, but a typical spin/spray combination requires one side to be cleaned, then manually or robotically flipped over and placed back on a different spindle to clean the second side. The throughput of such equipment (number of lenses per hour) versus the labor cost and capital cost is very much higher than the old Freon cleaners it replaced, which are now environmentally unacceptable.

A second way of aqueous cleaning is to have an ultrasonic, water-based detergent solution in the first stage of a countercurrent-flow, multi-station, automated cleaning line with conveyorized transport taking the lenses through successive immersion tanks (typically, at least five, and preferably 7–15 stations, including deionized water rinses).

Whether by high-pressure water spray or by ultrasonic, multi-stage tank immersions, the resulting clean-but-still-wet polycarbonate lens cannot yet be dipped into the liquid hardcoatings (which are all chemically incompatible with any significant % water), so they still face another problem, and that is how to completely remove all the remaining water from the lens (and/or its lensholder rack), without creating superficial stains ("water spots") on the lens' optical surfaces. In the case of water-immersion tanks, the last tank is typically maintained at a very high temperature, near the boiling point of water (which can cause lens "fogging" due to high % humidity inside the cleanroom wherein dipcoating drydown must also be done), and the withdrawal rate of the lenses being removed from the tank is extremely slow, to encourage capillary effect to maximize water removal. In the case of spin/high-pressure spray, centrifugal action of high-RPM spinning speeds is attempted to sling off all excess water. Nevertheless, because the liquid hardcoating solutions cannot stand even small amounts of water "dragout" introduced by lenses (even small droplets of water will result in streaky or spotty fogging of the coated lenses or blotchy appearance). So, inevitably, a hot-air-circulating dryer (filtered for cleanliness) must be used, which makes for an energy-intensive and costly operation. The multi-station automatic-transfer water cleaner in-line system takes up a great deal of floor space and costly (multi- $100,000). In addition, disposal of the liquid effluent from these aqueous cleaning solutions is turning out to be an environmental problem not previously encountered with the Freon cleaners it replaced.

3. OBJECTIVES OF THE INVENTION

For these reasons, one objective of the present invention is to produce cleanly-demolded multicavity Rx lenses which are ready to dipcoat without cutting or trimming, nor any use of Freon or aqueous cleaning protocols, with a molded-on hanger tab having special design suited for robotic handling and transfers.

Another objective of the present invention is to have no human operator touch the lenses, starting from the time that multicavity demolding starts until after the hardcoating is at least partially cured to a tackfree state. Preferably, for minimal airborne contamination, no human operator will even be inside the same cleanroom airspace which surrounds the lens from start of demolding until after the hardcoating is at least partially cured to a tackfree state.

Another objective of the present invention is to increase productivity by changing the "unit of transfer" being handled from individual Rx lens of the prior art to paired molded-together Rx lens, which come from the mold ready to be robotically handled by means of the molded-on hanger tab having special design.

Another objective of the present invention is to minimize any plastic "flash" at the parting line edges of the paired molded lenses, so as to prevent dipcoating flow runs propagated off such flash and/or to eliminate any trimming off of flash before dipcoating, since such trimming processes generate plastic airborne particulate contaminations.

Another objective of the present invention is to be able to demold the lens cleanly, with ejection processes generating minimal (or none) metal or plastic airborne particulate contaminations.

Another objective of the present invention is to further reduce manufacturing costs of Rx polycarbonate lenses by improved % yields, less work-in-process inventories, and better labor productivity by this novel fully-automated continuous-process flowsheet vs. prior art batch-process flowsheet.

4. SUMMARY OF THE INVENTION

The present invention employs "design for manufacturability" principles found lacking in the prior art. An essential element of the present invention is that the unit of transfer, from the demolding step on through the coating-and-curing step, should be a pair of Rx lenses, not individual Rx lenses. Thus, each time a robotic transfer takes place, output is effectively doubled in this way. This insight is not found in the prior art, which teaches and shows only one single lenses per tab.

A second element is to provide means for a flash-free injection-compression molding process, using 2-stage spring-loaded forces which determine the cavity height of variable volume mold cavities during the filling and the ejecting phases of the cycle. (As used herein, "parting line flash" means plastic spilled out of the moldset along the parting line where the A side and B side of the moldset joins). Since any plastic "flash" at the parting line edges of the paired molded lenses is most likely to occur in the last fractions of a millimeter of the "mold-closing" compression stroke during such a filling process, this element greatly increases the spring forces which hold the moldset's parting line shut only during this last half-millimeter of compression stroke. Eliminating flash prevents dipcoating flow runs which readily propagate off such flash and/or to eliminate any trimming off of flash before dipcoating, since such trimming processes will generate plastic airborne particulate contaminations.

A third element is novel demolding operations which minimize or eliminate generation of airborne particulates which can contaminate the molded Rx lens product. This element first is embodied into Rx lens product designs most specifically, the lens edge detail geometry. Secondly, apparatus considerations must be built into them old design to provide the required process steps of automatically stripping molded paired Rx lens off, when the mold is fully open and a robot arm with suitable gripper jaws is in its proper location to receive the ejected paired molded Rx lens (no manual assistance is to be needed during demolding.)

A fourth element of the present invention is elimination of all cutting or trimming of solidified thermoplastic once demolding has occurred, until after dipcoating has been applied and cured at least to a tackfree state. Eliminating flash by improved molding process (by the 2-stage spring force) is better than trimming flash off later. Any ejector tabs or drip tabs must be suitably located along the lens perimeter so as not to interfere with proper dipcoating and not to propagate coating flowout runs. Specifically, no such tabs will be placed in the upper 90-degree quadrant (defined as 10:30–1:30 o'clock locations) of the lens perimeter. The molded paired Rx lens must be connected therebetween by a cold runner, with said runner located in the 1:30–4:30 o'clock side quadrant for the left lens and the 7:30–10:30 o'clock side quadrant for the right lens.

A fifth element of the present invention is an integrally-molded hanger tabs typically located substantially equidistant between the two lenses in the molded pair and rising substantially vertically off of the cold-runner connecting the paired lens (such symmetry has the advantage of minimizing side-to-side tilting of the paired lens). In an optional but preferred embodiment, the head of this molded-on hanger tab will be above the highest top edge of the molded pair when held vertically, so as to prevent the liquid dip hardcoating from contacting the robotic means for gripping the head, so the stem length between the head and the cold runner should be at least sufficiently above said top edge of lens. Most preferably, the stem will be sufficiently longer so that a second gripping position with protruding slide-stop can be located also above the top edge of the paired lens. (In an alternative optional but less-preferred embodiment, the head of this molded-on hanger tab will be below the highest top edge of the molded pair when held vertically, used with periodical clean-off of the accumulated dip hardcoating which has contacted and cured onto the robotic means for gripping the head.) Special features are designed into the head so as to geometrically mate with certain robotic devices, workholders and racks.

Optionally, a drip tab is located in the bottom quadrant of each lens (4:30–7:30 o'clock positions), to minimize dip-coating dripmark size, by capillary wicking action to drain off excess liquid coating once the molded paired lens have been fully removed from immersion in the dipbath. These optional drip tabs would, however, have the disadvantage of required a trimming operation after coating is cured, and also they will increase polycarbonate resin usage+cost per lens.

These four elements of the present invention enable multi-cavity injection molding of polycarbonate spectacle lens to be integrated via full automation with dip hardcoating, to produce clean hardcoated molded paired lens made entirely within a single continuous cleanroom air enclosure surrounding the lenses, without any human operators therein, nor requiring any cutting or trimming of the molded lens or runner system before hardcoating, nor use of Freon CFC nor aqueous cleaning protocols before dipcoating. The novel combination of Applicants' lensmold processes and apparatus and molded lens design for the manufacturing processes contribute to this end. An extension of this cleanroom enclosure and robotic handling may optionally provide in-line continuous-product-flow automatic inspection of optical power and lens cosmetic quality, and/or may optionally provide in-line continuous-product-flow anti-reflective thin-film vacuum coating, before the molded-and-hardcoated polycarbonate lenses exit out of the continuous cleanroom air enclosure and/or receive manual handling.

Another novel improvement using a special spring-loaded assembly of 2 different types of springs has been shown to reduce parting line flash in variable volume injection-compression molding process, applicable to any edge-gated molded plastic article.

5. DESCRIPTION OF DRAWINGS

FIGS. 3, 3A, 3B, 3C and 3D shows the paired molded lenses after ejection, with preferred hanger tab location and stem length, and specific head and stem configurations of the present invention suited for mating with different variations of robotic gripping position and workholder mating geometries.

FIGS. 4A, 4B, 4C and 4D show manufacturing flowsheets, with the process steps shown in block diagram, and those steps which are to be done robotically within a cleanroom are shown within dashed-line boxes.

6. DETAILED DESCRIPTION OF THE INVENTION

A. Lens Formation and Ejection within Moldset.

Figure 1:
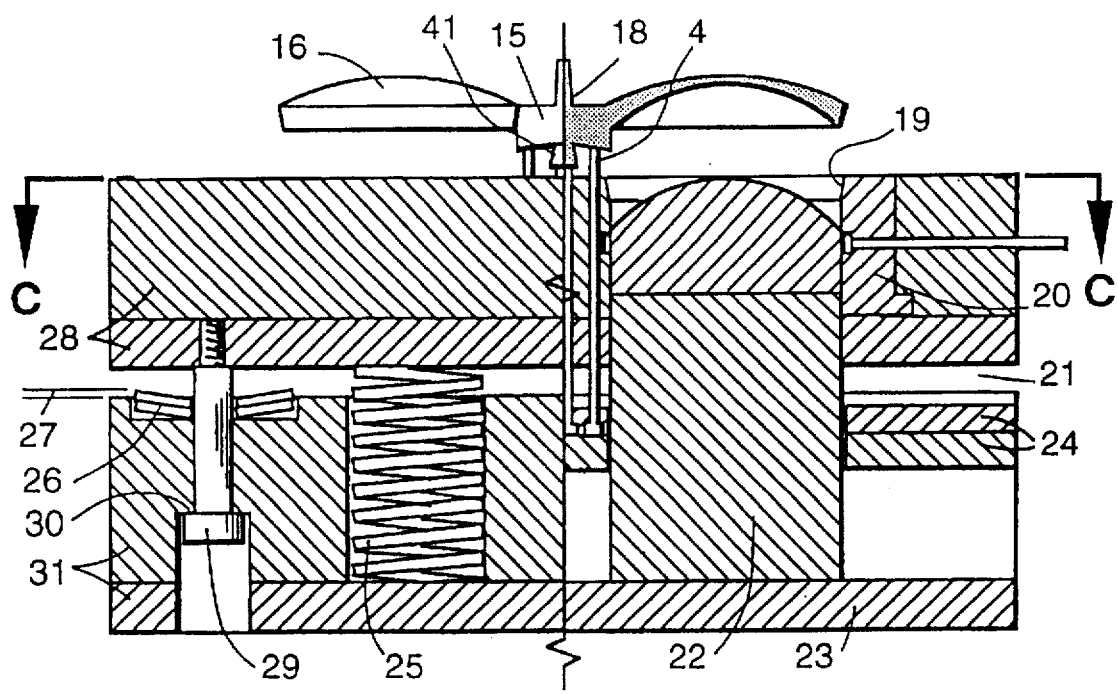
FIGS. 1, 1A and 1B show a two-cavity Rx lens mold of the present invention, in 2 cross-sectional split views (showing different stages of molded lens formation and ejection/demolding steps within a single molding cycle) and in a plan view.
Figure 1A:
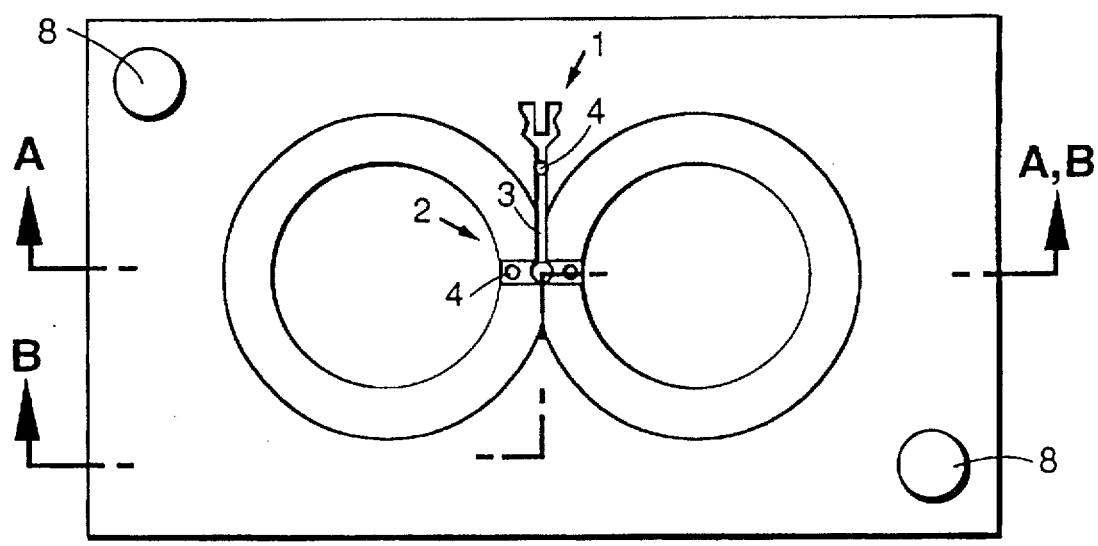
Figure 1B:
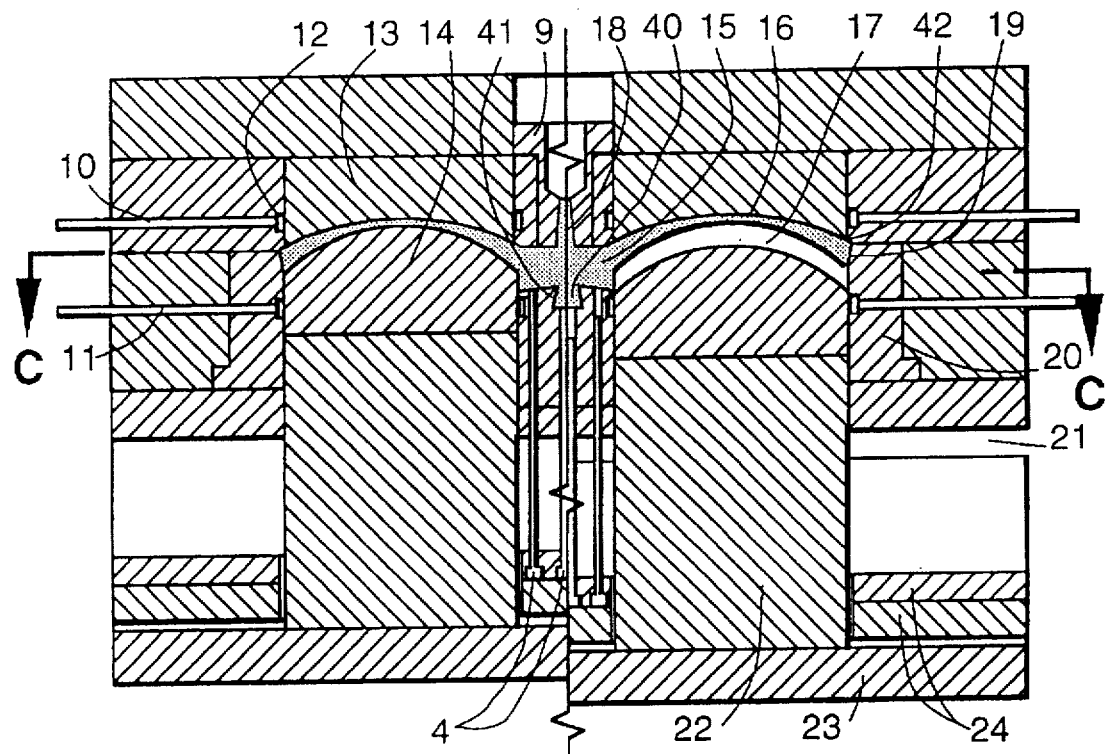

The present invention employs a novel and advantageous method and apparatus for ejecting multi-cavity injection-compression- molded Rx lens, in molded pairs each with a hanger tab (see FIG. 3), while preserving cleanliness of both the demolded paired lenses and the optically polished molding surfaces of moldset, free of metal or plastic particles. Refer to FIGS. 1, 1A and 1B, showing a simplified two-cavity lens moldset, with the injection molding machine nozzle tip (not shown) injecting into a cold sprue bushing (9) and cold runner system (15) which is centered between the two mold cavities. An optional but preferred embodiment for molding two or more pairs of Rx lenses during one cycle of a single moldset would employ instead a hot-runner system using a plurality of hot-runner nozzle tips in place of the single injection molding machine nozzle tip which injects into cold sprue bushing (9) and cold runner system (15); such a hot-runner apparatus for a four-cavity mold is shown in Applicants' U.S. Pat. Nos. 4,828,769 and 4,900,242 (incorporated herein by reference), FIG. 17. Another alternative hot-runner system for optical thermoplastic molding is shown in Applicants' U.S. Pat. No. 4,965,028, incorporated herein by reference. A cold well (40) is advantageous to build into the cold sprue and cold runner system, to trap "cold slugs" before they reach the lens mold cavities. Note that a slight undercut (41) or negative draft angle on cold well (40) will provide a positive mechanical retention force, which is helpful later on in ejection steps.

Another optional but preferred embodiment for molding pairs of Rx lenses within a single moldset would employ "variable volume" mold cavities, wherein the initial cavity height dimension is larger before injection starts than the final molded lens thickness dimension. Such a "variable volume" mold cavity moldset apparatus typically uses an injection-compression molding process sequence to mold the Rx lens, wherein a driving force squeezes the injected melt sometime after injection starts to reduce this cavity height dimension (refer to cited prior art lens molding patents for various schemes for driving forces and sequences). A preferred one shown in Applicants' U.S. Pat. No. 4,828,769 & 4,900,242 employs a resilient member 13 (such as a hydraulic cylinder or a mechanical spring) of FIG. 10B to determine the cavity height dimension, so that when the resilient member 13 is extended or uncompressed, the cavity height dimension is larger, by a compression stroke-length 40 dimension, and when the resilient member 13 is contracted or compressed (such as by increased mold clamping forces exerted by the injection molding machine squeezing the platens together, most preferably before injection is completed), the cavity height dimension is made smaller by making the compression strokelength 40 dimension become zero. See FIGS. 2–8 which show this injection compression process sequence throughout one complete molding cycle.

It has been found by Applicants since that patent was filed that use of hydraulic cylinders for the resilient member 13 within polycarbonate Rx lens molds is disadvantageous, since such moldsets run at very hot (240–295 F.; 120–150 C.) temperatures, causing seals to leak and oil to contaminate the partforming surfaces. Use of conventional coil-type die springs as resilient member do not have that problem, and are long-lived, and can give the long compression strokelengths (as high as 0.400" or 10 mm has been used to mold very high minus power Rx lens with 1.0–1.5 mm lens center thickness with 10–14 mm edge thicknesses with minimal "knitline"). However, they have flash problems during moldfilling; to eliminate parting line "flash", the spring force holding the parting line shut must exceed the force of melt pressure being exerted upon the projected area wetted by melt, and within the last 0.1–0.5 mm of the compression stroke is when typically such flashing can occur. Parting line "flash"(plastic spilled out of the moldset along the parting line where the A side and B side of the moldset joins) must also be eliminated or minimized, as it will otherwise be trimmed off before dipcoating (thus generating particulates) or it may create liquid dipcoat flow runs. Use of extremely stiff, high-deflection-force conventional coil-type die springs as resilient member to solve that problem create a different problem during the ejection phase of the molding cycle, however, since as soon as the clamping force is released in preparation for mold opening, these high spring forces act as a catapult for the lenses and cold runner by prematurely pushing forward the parting line molding surfaces before the injection molding machine's ejection mechanism is actuated.

The present invention preferably can employ a novel combination of 2 different types of moldsprings within the moldset to give "2 stage" workings of these "resilient members". As shown in FIG. 1, (shown in split cross-sectional view, when the spring is uncompressed, such as by releasing mold clamping forces exerted by the injection molding machine during ejection phase of the cycle), a conventional coil-type steel die spring (25) having long compression strokelengths but moderate deflection force are used in combination with extremely stiff, very high deflection force stack of Belleville spring washers (26) held in place by shoulder bolt (29), to give 2 different levels of moldspring forces during 2 different phases of the strokelength—when either initial mold-opening or final-closing movements are in the 0.0 to 0.5 mm range, the very high deflection force stack of Belleville spring washers (26) dominate; from then on, the weaker coil-type die spring (25) are the only applicable spring force, giving a controllable mold-opening stroke (too high spring forces can then almost "catapult" the paired molded lenses off the B side, held on only by retention (41)). Together, they determine the variable volume cavity height dimension, on each molding cycle to create a compression strokelength (21), up to a maximum dimension determined by shoulder bolt (29) In such an optional but preferred embodiment of the present invention, this injection compression process sequence is as shown in Applicants' U.S. Pat. No. 4,828,769 & 4,900,242 FIG. 2–6, but differ thereafter (not as shown in FIGS. 7 & 8), in how the Rx lenses are to be de-molded and ejected. For a flash-free injection-compression mold filling process, using 2-stage spring-loaded forces greatly increases the spring forces which hold the moldset's parting line shut, only during this last half-millimeter of compression stroke. This process automatically changes the sum of the 2 springs' force just when greater force is needed, in the last fractions of a millimeter of the "mold-closing" compression stroke during such a variable volume mold filling process.

Applicants' 2-stage springload combination (stiff-spring applied only a shortstroke+soft- spring applied over the whole longer stroke) is an improved form of "resilient member" operating within any such variable-volume injection compression mold in which the cavity height is determined by the degree of elongation of springs. A review of the prior art cited herein and cited in Applicants' U.S. Pat. Nos. 4,828,769 & 4,900,242 shows no such 2-stage springload combination, nor any such insight into the benefit thereby. Specifically, any edge-gated plastic articles to be molded within a variable-volume injection compression mold in which the cavity height is determined by the degree of elongation of springs will have the same tendency toward parting line flash, and the larger the projected area of the cold runner system (especially if large fan gates or full-length runner-gating is used), the worse the flash problem will be. If the article is flat and meltflow pathlength is short, then a very short (0 to 1 mm) compression strokelength can be used, for which a single very stiff spring geometry is satisfactory, so Applicants' novel 2-stage springload combination is then unnecessary. However, if the article is of non-flat contour and meltflow pathlength is longer, then a longer (>1 mm; typically 2–10 mm) compression stroke-length must be used, for which a single very stiff spring geometry is unsatisfactory. Applicants' novel 2-stage springload combination is then useful and necessary, to control flashing tendency. Such other articles may be other precision optical lens products (such as light-amplifying LCD lens arrays for flat panel displays, many optically microstructured surfaces replicated through molding including "binary optics", "hybrid optics", fresnels and holographic imaging) and molded automotive windows, headlamp lenses, and mirrors, but flashfree non-optical opaque injection-compression moldings of similar geometries is also contemplated, such as large auto exterior body panels (hoods, doors and fenders) and in-mold-textile-surfaced interior panels. All these non-spectacle-lens applications are known to have considered or used variable-volume injection compression molding, and the flash problem is believed to have detered some from actual use. Applicants have recently run such variable-volume injection compression molds with and without the novel 2-stage springload combination, and these tests have proven clearly the anti-flash benefits claimed.

Such an injection-compression molding process for reduced parting line flash on at least one molded thermoplastic article operates within a moldset mounted within an injection molding machine having programmable control of means for applying clamping forces and opening forces onto a parting line formed between A side and B side of the midset, and the injection molding machine has programmable control of means for moving forward or back an ejector assembly within the B side of said moldset. The moldset has at least one edge-gated variable-volume mold cavity having partforming surfaces on opposing paired A side insert and B side insert facing the parting line, and at least one extendable and compressible passive resilient member of varying length determines a cavity height dimension of the mold cavity within preset mechanical limits. The resilient member being an operative combination of:

i) steel coil die spring to provide a moderate spring force over a very long distance in a first clamping position of the midset, with ii) stacked Belleville type steel spring washers to provide a very stiff spring force over a very short distance in a second clamping position of said midset, with the resilient member being mounted between the B side parting line mold plate and B side clamp plate of said moldset, and exerting combined spring forces to bias forward the B side parting line mold plate toward the parting line. In the injection compression molding process, when there is less clamping force exerted by the injection molding machine than a first spring force equal to the steel coil die spring force acting alone to bias forward the B side parting line mold plate toward the parting line, the resilient member length will be a maximum within the preset mechanical limits in a first clamping position of the moldset, and when there is more clamping force than the first spring force equal to the steel coil die spring force acting alone to bias forward toward the parting line but less clamping force than a second spring force equal to the steel coil die spring acting together with steel spring washer force to bias forward the B side parting line mold plate toward the parting line, the resilient member length will be an intermediate value in a second clamping position of the moldset, and when there is more clamping force than the second spring force equal to the steel coil die spring acting together with steel spring washer force to bias forward the B side parting line mold plate toward the parting line, the resilient member length will be a minimum within the preset mechanical limits in a third clamping position of the midset.

This process has the steps of:

a.) Pre-enlarging the mold cavity by substantially closing a perimeter of the mold cavity at the parting line so as to prevent molten thermoplastic from flashing, in a first position of the moldset formed by applying a clamp force equal to a first spring force, such that a first cavity height equal to the sum of the desired compression strokelength plus a final thickness of the molded article is determined, before injection starts;

b.) Partially filling the mold cavity after injection has started by progressively reducing cavity height in a second position of the moldset formed by increasing clamp force applied to exceed the first spring force but less than the second spring force;

c.) Completely filling said mold cavity after injection has ended by further progressively reducing cavity height to reach a third position of the moldset formed by increasing clamp force applied to exceed the the second spring force;

d.) Cooling said molded article within the mold cavity after injection has ended by maintaining cavity height substantially at the third position of the moldset formed by maintaining clamp force applied to exceed the the second spring force until a maximum cross section is below a glass-transition temperature characteristic of the thermoplastic;

e.) Ejecting the molded article by releasing clamp force and opening the moldset along the parting line.

In accordance with the present invention, once the optical-grade thermoplastic has cooled to at least the glass-transition temperature (for polycarbonate, this equals 296° F.) in even the thickest cross section, then the resulting molded lens should be shape-stable (the plastic molecules will have memory). Since molding productivity is enhanced by faster heat transfer rates between the cooling melt and the mold inserts, it may be advantageous to employ highly-conductive copper-based alloys, with a hard electroplated chrome or nickel face on the optically-polished partforming surfaces, as materials for construction of the mold inserts. Applicants' U.S. Pat. No. 4,793,953 (incorporated herein by reference) is one such example, for use in optical molding. A further improvement in optical molding thermodynamics is Applicants' U.S. Pat. No. 5,376,317 (incorporated herein by reference) employs such highly-conductive copper-based alloy mold inserts in a molding cycle which starts with mold insert surface temperatures above the glass-transition temperature, then after the mold cavity is filled and packed, drops the mold temperature far below the normal hot (240–295 F.; 120–150 C.) temperatures used for Rx polycarbonate lens molding.

The first step of demolding and ejection of the paired lens starts with releasing clamping forces applied by the injection molding machine, thereby decompressing and extending the resilient member comprising the combined springs described above. See FIG. 1B, righthand split view, showing the molded lens (16) has already been separated off the B side core insert (14) optically-polished partforming surface, creating a release space (17) between the concave lens surface and the convex insert surface upon which it was formed. This release space (17) substantially corresponds to the compression strokelength (21) dimension, when the moldset spring is extended or uncompressed by releasing mold clamping forces exerted by the injection molding machine during the very start of the ejection phase of the cycle. At the same time, drafted sleeve surface (19) forming the lens edge uses thermal shrinkage of the molded lens to assist separation off the mold cavity bore (sleeve 20) surfaces. Importantly, were zero draft employed in the bore which forms the lens edge, as is common in today's Rx polycarbonate lenses made by prior art methods, these lenses could be so strongly held onto the B side mold insert (14) by partial vacuum that the lenses are pulled back when the springloaded parting line B side mold plate (28) comes forward (relative to the B side mold insert). Applicants have seen such examples, where the still-hot gates are bent or, even worse, torn off, leaving the lens stuck onto the B side insert deep inside the bore. By applying some positive draft to the B side sleeve, a mechanical interference is created which prevents this possibility of the lenses being pulled back into the bore.

See FIG 1B. Note that the parting line (C—C cross-sectional plane) is not yet opened at all, even though the movable platen has traveled rearward (compare the moldset height measured between A clamp plate (25) and B clamp plate (23) vs. the lefthand split view which shows the fully-clamped condition). With or without an optional air blowoff, when the parting line starts to open up, the molded paired lenses are already transferred off the B side and are being pulled off the optically -polished partforming surfaces of the A side concave inserts (13), since the cold sprue (18) and cold runner (15) of the molded paired lenses are still firmly attached to the ejector mechanism (which is not yet actuated), using conventional mechanical retention (41) (shown as controlled-draft-angle on the cold well (40) of the sprue) to "grip" the molded paired lenses (16) onto the B side. (Also, deliberately running the coolant temperatures on the B side cooler than those of the A side can cause more shrinkage to occur on the B side of the molded lenses, thus reducing retention forces on the A side of the lens.)

See FIG. 1. As the injection molding machine's mold opening continues after the maximum forward travel of the springloaded B side mold plate (28) is reached (set by the shoulder bolt (29)), then the parting line opens up. Once the A & B sides are no longer held together, stripping forces are automatically applied by this mold opening motion which will exceed the partial vacuum that may exist between the convex surface of the molded lens and the corresponding concave mold insert surface upon which it was formed, since the molded paired lens are still held by mechanical retention forces (41) onto the movable platen B side of the moldset. As long as these B side retention forces exceed the force wanting to hold the lenses onto the A side inserts without exceeding the cohesive strength of the plastic in the cold runner and gate, pulling the lenses off the A side will be mechanically positive when the parting line opens up sufficiently during mold opening.

Next, as shown in FIG. 1, the paired molded lenses (16) and connecting cold runner system including mechanical retention (41) are stripped off the B side by conventional ejector pins (4), which are driven by motions of the injection-molding machine's hydraulic ejector cylinder (not shown) tied into the moldset ejector plates (24), to which the ejector pins (4) are mechanically tied in. Stripping the lenses off the B side will also be mechanically positive. This step is done only when the moldset is fully opened up along the parting line, and timing of this ejector motion is only initiated after the end-of-arm tooling of a takeout robot is in place to receive the molded paired lenses while being stripped off of the mechanical retention. This timing is coordinated between a programmable control of the injection molding machine and of the takeout robot, with part verification to confirm that this handoff has been made. Many brands and types of takeout robots exist for plastic injection molding machines. A side entry type is preferred over the more column "up and out" rectilinear type, since the space above the mold platens is preferably where downward-facing HEPA filters will be located, and since a cleanroom enclosure will be smaller and more compact if a side entry type is used. Typical makers of side entry takeout robots include Ranger Automation of Shrewsbury, Ma., Conair Martin of Agawam, Ma., and Automated Assemblies of Clinton, Ma.

Note that the above-mentioned ejection sequence differs from the conventional way plastic parts are ejected from injection molding, which starts by stripping the molded part off the partforming cavity surface first, when the mold starts to open, while holding the molded part onto the partforming core surface. After the mold is fully open, either a robot arm or human operator then reaches in and pulls the molded part off the partforming core surface.

In an optional but preferred embodiment of the present invention, filtered compressed air is employed in accordance with a prescribed "air blow" sequence of steps in order to provide a supplementary driving force for separating the molded lens off the optically polished part-forming surfaces, to which they are held by natural vacuum due to thermal shrinkage while the mold is closed and the clamping force is maximized. Although use of compressed-air blowoff to assist ejection is not new to those skilled in the art of injection-molded thermoplastics generally, Applicants are not aware of it ever being employed in optical lens injection molding, and it is not found in any of the prior-art patents relevant to this field. Refer to FIG. 1B. Applicants employ filtered compressed air (for cleanliness of part-forming mold surfaces as well as molded lens surfaces), introduced by A side air line (10) and B side air line (11), into the clearance gap (12) formed between the outer perimeter of each cavity insert (A side cavity insert (13) and B side core insert (14)) and the bore of circumferentially-surrounding sleeve (20).

Air valves (not shown) control the air flow and pressure within air lines (10) and (11) to provide air blow in an ejection sequence, working in combination with conventional ejector pins (4), which are driven by motions of the injection-molding machine's hydraulic ejector cylinder (not shown) tied into the moldset ejector plates (24), to which the ejector pins (4) are mechanically tied in.

In an optional but preferred embodiment of the present invention, even before the parting line is opened, filtered compressed air feeds through these "vent gap"-sized passageways gap (12) (for polycarbonate lens, a gap of 0.001" (0.025 mm) still will not "flash"), so that the forces of the air begin to be applied on the movable platen B side (core side) around the perimeter of the convex insert, and work inward toward the center of the lens, to provide a clean separation off the convex part-forming surfaces of the B side insert. At the same time, drafted surface (19) of the lens edge uses thermal shrinkage of the molded lens to assist separation off the mild cavity bore (sleeve 20) surface. To assist separation of the paired lenses off the stationary platen (A side) of the mold before the parting line is opened, in an optional but preferred embodiment of the present invention, a second stage of air blowoff can be initiated, wherein similarly filtered air enters up around the perimeter of the concave optically-polished A side mold insert perimeter and driving toward each lens center to break the partial vacuum formed during molding. During this time, a substantial seal is still held by a tiny edge seal overlap (42) of the lens front onto the lens mold cavity perimeter. See FIG 1B. If this tiny seal overlap (42) is missing, air blowoff forces will be substantially weakened and may be ineffective, since the air will follow the path of least resistance and bypass the lens center, leaving some partial vacuum force wanting to hold the molded lens in place during the next stage of ejection, which is mechanical stripping the lens off the concave insert surfaces by the molding machine's clamp-opening stroke while the paired lenses are being firmly held onto the ejector apparatus which moves along with the B side of the moldset.

B. For Cleanliness, Never Cut Solidified Plastic Before Dipcoating

Each polycarbonate dipcoated lens is inherently edge-gated and is hardcoated by a glossy film which is easily seen to form a "dripmark" (resulting from gravity flow of the liquid dipcoating onto both front and back surfaces). To examine such an Rx lens, let us look at a plan view of the molded hardcoated lens, and find the location of the dripmark (easily observed as a buildup (37) of the relatively-thicker hardcoating glossy film, as seen in FIG. 2B. When laid out as a clock face, let us arbitrarily designate the location of any lens' dripmark as in the 6 o'clock position. By examining this lens-edge sidewall, starting at the dripmark and going circumferentially all the way around, one can see if any ejector tabs were used, and if so, were the cut before or after dipcoating, because if these tabs would be cut off before or dipcoating, it will show a glossy covering over the cut mark/residue,. in addition to the degating residue where the gate has been removed.

Observing lenses sampled from the current market, the Gentex and Neolens lens samples typically show one or more ejector tabs, most commonly 180 degrees opposite the gate. The Neolens sample showed four such ejector tabs+the gate, all of which were cut off before the cleaning and dipcoating operations (like Comparative Example FIG. 2,)

The reason why tabs in some lens edge locations cannot be tolerated in the dipcoating process is that liquid coating on the top half of the lens would run down by gravity from the tip of the ejector tab over the lens edge, and this liquid stream of coating will then flow vertically down from that perimeter location of the ejector tab along the front or back optical surface of the lens. This "coating flow runs" creates nonuniform lightbending (=aberrated image seen when looking through the accumulated thicker coating), causing a rejection of the manufactured lens. If one or more ejector tabs must be cut off the molded polycarbonate lens before dipcoating, this not only adds to the variable cost (higher resin used per lens, more labor cost for operator handling and trimming operations, but it also directly reduces surface cleanliness of the freshly-molded lens. There is no way to cleanly cut solidified polycarbonate plastic without inevitably generating fine airborne particulates ("polycarbonate dust"), which immediately re-deposits onto the front and back optical surfaces of the polycarbonate lens, because electrostatic attraction forces will draw and bind them to the high-dielectric-constant polycarbonate surface layer. Use of ionizing-air blowers can minimize this electrostatic attractive force, but actual tests of freshly demolded lenses with fieldmeters show 5–30 kilovolts of static charge, which is only very slowly dissipated (in minutes, not seconds) due to excellent electrical insulation properties of polycarbonate.

Even when no ejector tabs are cut before coating, if the lens must be degated so that it can be hung via molded-on hanger tab onto the lensholder rack (see Comparative Example FIG. 2), or if a molded pair of the lens must have the cold runner cut so that it can be inserted, via molded-on hanger tab into the lensholder rack (see Comparative Example FIG. 2A), then these degating and/or runner-cutting operations will also generate the fine polycarbonate dust as airborne surface contaminants. All apparently also some require manual handling by human operator between molding and dipcoating steps. After trimming and mounting into lensholder racks, these polycarbonate lenses are cleaned to remove any soluble surface contaminants (such as oil) and insoluble particulate soils (such as airborne inorganic dusts, but most troublesome, the fine polycarbonate particles generated by the trimming and degating and runner-cutter operations).

Applicants' U.S. Pat. No. 4,828,769 and U.S. Pat. No. 4,900,242 licensees' lenses do not use any ejector tabs, as can be verified by examination of the lens edge. Nevertheless, if the injected shot (into a plurality of lenses connected by cold-runner melt delivery system) most be cut apart in order to be mounted into lensholder racks, then these runner-cutting operations have the same undesirable effect of generating polycarbonate dust. The statistically greatest source of percent yield loss is the flaw category known as "coating clear specks", wherein a transparent/translucent particle, of sufficient size and location so as to disturb vision, is encapsulated inside the liquid-applied hardcoating's glossy film. Obviously, vigorous cleaning and multi-stage dilution factor can make a difference in reducing this economic loss and percent yield. Nevertheless, even with today's best cleaners, it remains the greatest source of scrap lenses.

Refer to FIG. 1A. The molded paired lenses of the present invention will have no hanger tabs (1) in the upper 90-degree quadrant (6) (between 10:30 and 1:30 o'clock), will be gated (4) within right and/or left side quadrants (5) and (−5) (between 1:30 and 4:30 o'clock for (5) and between 7:30 and 10:30 o'clock for (−5), respectively), and if they use an (optional) drip tab (not shown), it will be located in lower quadrant (7) (between 4:30 o'clock and 7:30 o'clock). See also hanger tab stem (3) and open-spring head configurations described more in examples referring to FIG. 3.

Now see Comparative Examples on FIGS. 2, 2A, 2C and 2D. In contrast to the cited prior art, note that no ejector tabs are Employed on the Applicants' lens perimeter itself (see FIG. 3), and most specifically, not at any location that would require cutting off before dip hardcoating.

Figure 2:
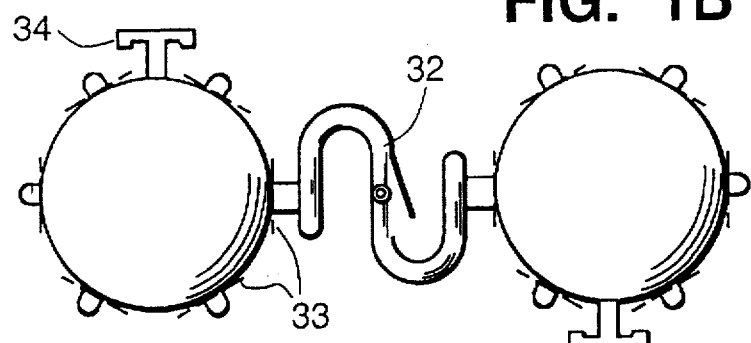
FIGS. 2, 2A, 2C and 2D show comparative examples from selected prior art, with special attention paid to location of dripmark and ejector tabs or gates that need to be cut before dipcoating can take place, as well as orientation of hanger tabs.

The Comparative Example of FIG. 2 shows a simplified 2-cavity lens molding with cold sprue and runner (32). Note that each lens has a multiplicity of ejector tabs and the gate, each of which must be cut (33) in a separate operation after demolding before dipcoating, using molded-on "T" shaped hanger tab (34). The prior art patent which most closesly resembles this Comparative Example of FIG. 2 is Weber (U.S. Pat. No. 4,008,031), differing only in that Weber's T shaped hanger tab 20 is located directly opposite the gate 25, with an ejector tab 16 on each side of tab 20. Weber needs to cut off the gate feeding into drip tab 23 before dipcoating can be done.

Bakalar (U.S. Pat. No. 4,644,854), assignment to Neolens, shows in his FIGS. 4 & 5 use of ejector pin 15 opposite the gate, with no molded-on hanger tab shown. In actual practice, the Neolens molded lens has a plurality of ejector tabs and ejector pins which need to be cut before dipcoating, in an array just like the Comparative Example of FIG. 2, thus needing 6 cuts (33) to prepare each lens for dipcoating using a tab (34) of unknown shape at the location pictured in FIG. 3.

Weymouth (U.S. Pat. No. 4,933,119), assignment to Gentex, shows no ejector pins or hanger tabs, and does not teach any procedures for demolding or ejecting the molded lens. One must only assume that a human operator is employed to manually remove the molded lens, in which case high levels of airborne contamination onto the demolded lenses is inherent. All Gentex Rx lenses show at least 1 cut per lens before dipcoating (the cut is coated over with glossy film).

Figure 2A:
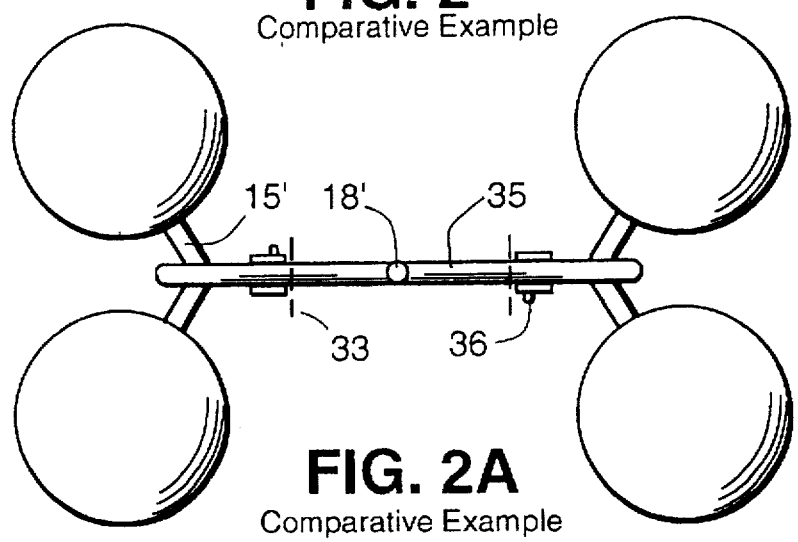

See now the Comparative Example of FIG. 2A, which shows a simplified 4-cavity lens molding with cold sprue 18' and runner 35 feeding into 2 pairs each of lenses, each having a gate 15'. Even if the closest prior art (Applicants' U.S. Pat. No. 4,878,969 and U.S. Pat. No. 4,900,242) were to be configured into 2 pairs as shown instead of 4 single lens, and even if a molded-on feature for gripping and fixturing were added onto the runner for each pairs, there is still no way to dipcoat these lenses as they are demolded, without at least 2 cuts (33) to separate the 4-cavity shot into the 2 pairs.

There are additional limitations Applicants' U.S. Pat. No. 4,878,969 and U.S. Pat. No. 4,900,242. See the ejection sequence in FIGS. 6, 7, and 8, wherein the resilient member 13 is kept in its compressed or retracted position, so that when ejector plate 17 is pushed forward by the injection molding machine when the mid parting line is completely open, then the B-side inserts 5b is pushed forward past the parting line plane, as shown in FIG. 8, and the molded optical lens or disk is ejected 97, as shown. This method of Rx lens ejection is NOT desirable for use with an in-line mold and dipcoat process scheme of the present invention, however. This reciprocating back-and-forth B side insert's motion within a tightly-fitting bore of at least several millimeters (high-minus, finished-single-vision lenses can easily be 10 mm edge thickness) must inevitably cause metal-to-metal wear and resulting galling (seen as scoring lines when viewing the molded lens edge; this is confirmed by visual examination of the molded lens edge of Applicants' licensee which uses this "traveling insert" method of ejection). The metal-to-metal wear that results must generate tiny metal particulate contamination which can be deposited on both the molded lenses and the part-forming surfaces of this optical mold, thus creating cosmetic rejects in the dipcoated lenses. Secondly, if severe galling takes place, the resulting irregular surface profile of the bore which forms the mold cavity sidewall then permits molten plastic to flow into these tiny galled-in crevices, which then gets sheared off during ejection forces (as the traveling insert is pushed forward), thus creating a fine particulate plastic "dust" for further airborne contamination of the demolded lenses and melding surfaces. For these reasons, the traveling-insert method is found not to be acceptable for the in-line, automated molding and dipcoating of the present invention.

Referring again to Applicants' U.S. Pat. No. 4,878,969 and U.S. Pat. No. 4,900,242, note that FIG. 9B shows drip tabs 99 in the 6:00 o'clock position of the molded lenses, but that even if there was a way of separating the two molded pairs shown without cutting after solidification of the plastic, the small cold well 31 is not located high enough to clear the lens edge so as to serve as a gripper or hanger tab for dipcoating, nor can cold-runner firm sprue 19 be separated without a cutting operation, which would generate plastic dust contaminants.

Figure 2C:
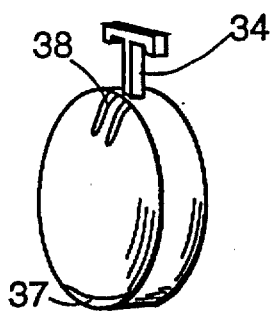

Refer now to FIG. 2C Comparative Example, showing a typical prior art single lens with tab (34) at 12:00 o'clock position. If dipcoating immersion strokelength is not extremely accurate, and the lens is immersed not just to the top lens edge but further, partway up the stem of the tab, then the liquid will run back down by gravity this stem, thus causing flow runs (38) streaming back onto the lens' optical faces. This is minimized but not entirely eliminated by reducing the tab thickness and setting tab, (34) back some distance from either face. Weber (U.S. Pat. No. 4,008,031) is one such example.

Figure 2D:
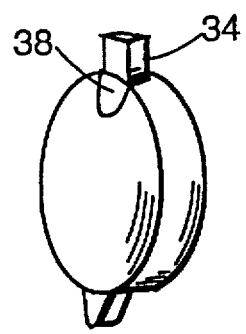

Refer now to FIG. 2D Comparative Example, showing a Liebler (GB 2 159 441A) prior art single lens with a tab (34) of the full thickness of the lens, at 12:00 o'clock position. Refer also to Liebler's FIG. 2, from which this lens is taken, showing lens F with lug 10 and driptab 11. If dipcoating immersion strokelength is not extremely accurate (which is impossible with Liebler's "endless conveyor" dipping the lens), the lens will inevitably be immersed partway up the stem of the tab, then the liquid will run back down by gravity this stem, thus causing a large flow runs (38) streaming back onto the lens' optical faces.

C. Lens Edge Detail Design for Clean Ejection

Refer back to Applicants' FIG. 1, which shows a drafted surface (19) of the mold cavity bore which forms the lens edge sidewall detail. In an optional but preferred embodiment of the present invention, this surface's draft angle will be a positive value, when compared to vertical ("zero draft"). This draft angle generally should be increased in value directly proportionally as lens edge thickness is increased. Also, note that adding a slight molded-on rim at the junction of the convex surface and lens edge sidewall (typically, no more than 0.5 mm per side is sufficient) which acts as a edge seal (42) (see FIG 1B) facilitates compressed-air blowoff which is optional but preferred with the present invention.

Molded or cast Rx lens blanks are sold in nominal diameters, rounded off to integral millimeters. Since all cast or molded plastic spectacle lens blanks are subsequently cut down on their perimeters so as to fit inside a specific spectacle frame of the patient's or prescribing doctor's choice, inherently all Rx lenses will be "laid out" to fit the mating spectacle frame. Because of various blemishes and flaws which can accumulate at the edge of cast Rx lens (such as bubbles or voids) and molded plastic lens (such as residual knit line or gate blush) or, due to the dip hardcoating (such as "dripmark"), the rule of thumb is to provide a waste zone, consisting of a perimeter band of 5 mm wide circumferentially around the lens edge. Thus, on a 76 mm-nominal-diameter lens blank, for layout purposes, only the inner 66 mm would be considered usable, when subtracting 5 mm waste zone per side.

The present invention utilizes the fact that waste zone exists in order to alter lens product edge and sidewall details for improved manufacturability. Refer again to FIGS. 1, 1A and 1B. Most specifically, in an optional but preferred embodiment of the present invention, Applicants provide for a plurality of interchangeable sleeves (20), each of which which can be selected with its different drafted surfaces (19) and assembled together with the appropriate mating convex insert (14) in order to mold each different lens power, so as to provide the cleanest possible release of the molded paired lenses free of solid metal or plastic particulates being generated by the ejection process. No one such sleeve draft angle or surface geometry can be optimum for all Rx FSV lens molding, which must encompass a wide range of product geometries. If too steep a draft angle is used all the way down the bore and sleeve surface which forms the lens sidewall, there will be a large enough clearance gap formed between the sleeve and the insert to "flash", which is unacceptable. Specifically, to mold a complete matrix of FSV plus- and minus-powered lenses will require the mold design to accommodate widely differing lens edge thickness. Plus-powered magnifying lenses (for correcting farsightedness) will have typically, a minimal lens edge thickness (2.0–0.8 mm). Conversely, demagnifying minus-powered lenses (for correction of myopia and nearsightedness), will have comparatively much thicker lens edge thicknesses (2.0–12.0 mm). Having zero draft angle on the thickest lens edges would become problematical. Nevertheless, because the mold tooling becomes much more complicated, the prior art patents show no such provision for changeable or adjustable draft angles. In actual practice, measuring some commercially available Rx lenses believed to be made by the cited prior-art patents shows a zero draft angle. and, therefore, reliance upon "brute force" to mechanically push out the lens in spite of high retention forces therein. Doing this also increases the probability of generating both metal-to-metal wear and shearing of metal to plastic, both of which produce solid particulate surface contaminations.

As shown in FIG. 1A and 1B, the present invention employs interchangeable mold sleeves (20) which become the part-forming surfaces for the lens' sidewall edge. By interchanging one set of such sleeves having a certain pre-determined drafted surface (19) with another set having a different pre-determined drafted surface/angle so as to mate with the corresponding B-side inserts for a specific desired FSV-power minus lens, one can centreliably increase or decrease the draft angle of the resulting molded paired lenses for the full range of FSV lenses as they are ejected, for cleanest molded-lens quality. The thicker the lens edge, and correspondingly higher minus power, the greater the draft angle that should be applied, but preferably only part way down the sleeve. For example, a −2.00 Diopter lens may have an edge thickness of 4.2 mm, and it will release cleanly with a drafted edge of only 1.9 mm. Conversely, a −5.00 Diopter FSV lens having a nominal edge thickness of 14.6 mm has clean release by using an increased drafted edge of 7.2 mm.

D. Molded-On Tab Designs Suited For Robotic Manipulation in Dipcoating Process Steps After paired lens, having the above-mentioned elements of the present invention, are formed within multicavity injection-compression molds of the present invention and are solidified therein, demolding is done within a cleanroom enclosure maintained preferrably at a positive pressure (vs. ambient) from HEPA blower units. A take-out robot is needed; preferably, the side-entry type, not "up and out" type, so that modular blowers supplying HEPA-filtered air can be located directly above the platens onto the molding machine, to maintain a preferrably positive-air-pressure within the clean room enclosure which substantially surrounds the mold (a deliberate gap located under the mold for an air exhaust may improve the downward-directed laminar flow pattern; similarly, a bottom gap for directed air exhaust is preferably located below the dipcoating machinery).

This side-entry takeout robot operates within a cleanroom-enclosed tunnel between the enclosed mold and an enclosed HEPA-filtered automated dipcoating machine. When the mold is opened at the parting line and the side-entry takeout robot's arm is moved into position, each pair of lens are ejected forward into gripping jaws of end-of-arm tooling mounted on the side-entry takeout robot's arm. In an optional but preferred embodiment, this robotic dipcoating machine with its self-contained, cleanroom-filtered air, positive-pressure HEPA filter will be located between two such injection molding machines and multi-cavity molds, with two such side-entry robots feeding paired lenses into this one robotic dipcoating machine. This "duo line", in-line system may be economically preferred embodiment versus a single molding machine and mold fed to a single coating machine, since typically Rx lens molding cycles are relatively long (1–5 minutes, depending upon Rx lens power and corresponding molding thickness). With longer-cycling lenses, the duo line configuration de-bottlenecks the molding step, for increased capacity output per unit of capital equipment cost.

See FIG. 4B, showing a block diagram flowsheet of the present invention's steps, within a single cleanroom enclosure (designated by the dashed-line, showing all steps are performed within its cleanroom airspace perimeter).

This robotic device or dipcoating machine may take a number of conventional forms with automated transport driven by chain-drive conveyors (operating singly or in parallel, connected by crossbars whereon the lensholder racks would be hung), or, alternatively, an indexable overhead conveyor or walking-beam conveyor. An optional but preferred embodiment employs a programmble SCARA cylindrical-type robot of the kind manufactured by IBM, GMF Fanuc, and Seiko. Such a SCARA robot should have a suitably-large (typically, up to 270 degrees rotation and at least 100 mm Z axis) work envelope, so as to be able to transfer these molded paired Rx lenses from a hand-off point somewhere inside the coating-machine clean-room enclosure to at least one hardcoating diptank, wherein a computer-programmable sequence of immersion times and withdrawal speeds can be employed, followed by transfer to a holding device which is part of a curing workstation fitted with conveying means therein.

Figure 3:
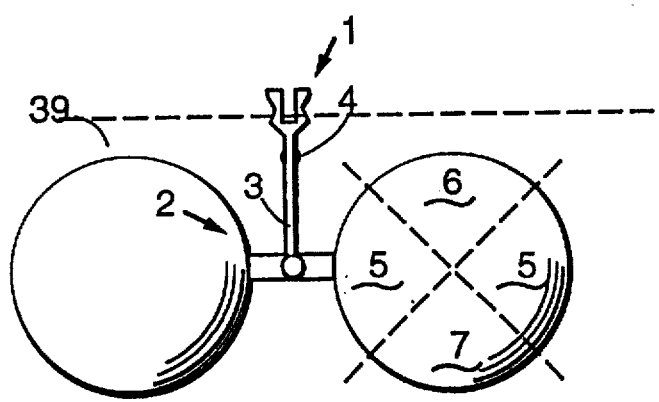
Figure 3A:
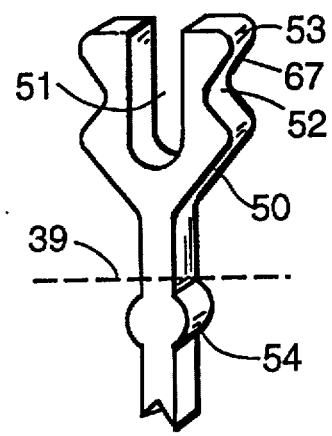

See FIG. 3, showing the paired molded lenses with hanger tab (1) comprising stem (3) and head (4), as they are received from the side-entry takeout robot, directly or indirectly handed off to the second robotic device. Note dashed line (39) showing the liquid level of the dipbath—everything below that line (39) will be immersed in the hardcoating solution. Note the workholder-mating horseshoe-shaped head's contoured surfaces (50 lead angle taper), (52 detent), and (53 insertion lead angle) are preferably located above the liquid level (39), so as to not contaminate downstream area where mechanical mating might dislodge coating flakes.

See now FIG. 3D. Preferably, this receiving second robotic device will be a programmable SCARA cylindrical-type robot arm fitted with a rotary wrist (not shown) capable of rotationally moving (70) about axis (69), and paired gripping jaws ((43) left and (60) right) which can move together (68) to grip or ungrip, in accordance with the program. See now FIG. 3C. Although the jaws are cut as substantially mirror-images of the head surface contours (50 lead angle taper), (52 detent), and (53 insertion lead angle), there is additional clearances ((63) vertical and (62) horizontal) provided for imprecise robotic "handoffs" when transferring the paired molded lenses from one workstation or operation step to another. Such clearances provide tolerance for slight misalignments or positional errors, yet complete the pickup or handoff properly.

Figure 3B:
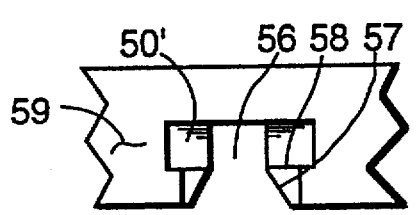
Figure 3B:
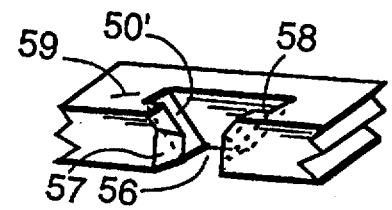

The gripping orientation shown in FIG. 3C is how the SCARA robot would hold the paired molded lenses during the dipcoating step's lowering and raising operations, after which the wet lenses can then be placed into one of the multiple workholder arms having a substantially-mated mirror-image-machined "nest" of FIG. 3B having tapered angle (50'), and stem placement relief (57) and stem retention step (58), with stem clearance (56). Such a workholder will be then used to automatically transport the wet lens through drying and curing steps. Means for such automatically transport can be conventional conveyors, but in an optional but preferred embodiment, a rotary index drive is fitted with many such workholder arms, as a carousel within the curing workstation.

The gripping orientation shown in FIG. 3D is how the SCARA robot would hold the paired molded lenses during the insertion of the head into a lensholder rack or similar fixture, wherein the receiving nest (not shown) has a protruding surface for mechanical interference with head detent surface (52) to prevent the head from being easily dislodged during transport. Insertion then requires the robot to exert a pushing force in the axial direction of the stem toward the head, sufficient to deflect the spring—the lead angle surfaces (53) assist in this friction fit, as does the spring relief (51) (the greater the relief and the thinner the legs, the easier to deflect the horseshoe shaped spring). Removal is the reverse of the insertion. Typically, this insertion will be done after the paired dipcoated lenses have been cured (at least to a tackfree state), then inserted into a rack holding many pairs, for transport manually after leaving the cleanroom to such other downstream "batch" operations as inspections (by humans), degating and packaging.

Another optional, but preferred, embodiment uses an intermediate step of robotically placing the molded paired Rx lens into a circulating filtered alcohol tank for a prescribed residence time therein, to perform the following functions:

1. De-statisizing (measuring surface charge by field meter, before immersion, the lens has at least 4–10 electron volts' static charge, even after being held under ionizing blower for a prescribed period of time; after alcohol-bath immersion of at least a couple of minutes, the lens has virtually no measurable surface charge).

2. Thermal cooling-off (measured immediately after demolding with a noncontact infrared pyrometer, the polycarbonate Rx lens typically shows a temperature of as high as 250° F. (125° C.) or higher; depending on residence time and alcohol bath temperature, this can be reduced to 120°–60° F., as may be required, depending upon solvent composition in the liquid hardcoating bath, to prevent "solvent burn" of the molded polycarbonate lens surfaces. It is well-known to those skilled in the art that certain solvents found in today's state of art hardcoating bath compositions can excessively attack a warm polycarbonate lens, causing cosmetic rejectable flaws due to excessive etching, frosting, and solvent-burn phenomenon, while being tolerant of the same lens at lower temperature.

3. Low-kinetic-energy cleaning/rinsing (soluble organic surface residues and lightly-held insoluble particulates can be removed by the circulating alcohol)

Advantages for using such an alcohol bath are evident especially if the hardcoating is solvent-based, since such solvents will typically attack a freshly-demolded hot (measured by noncontact infrared, actual temp can be 250 F. (125 C.) or higher) polycarbonate lens surface to create an etch or partly-dissolved surface layer—both damaged surfaces are optically rejected flaws. At room temperatures, the same dipbath solvents may not harm the lens. The problem then is that cooling in air takes many minutes, during which time even the best destatisized polycarbonate lens still has high enough surface charge (typically>3 KV) to attract any airborne dusts which are further stirred up by the localized thermal air currents created by the hot lenses, so even in a HEPA cleanroom, the hot clean lenses gradually become cool less-clean lenses. By immersing the hot paired lenses as soon as possible into the alcohol bath, they stay pristinely clean while heat is removed much faster (reducing the number of pairs of lenses held in the cooling state before dipcoating, so the equipment can become more compact), and surface charge becomes zero. For this immersion time of several minutes duration, it is best to have the robot place the paired lenses into an alcohol tank fitted with a stainless steel cover (or inert plastic equivalent) into which has been machined as many multiple head-mating "nests" (as shown in FIG. 3B) as are needed—the longer the immersion time desired, the more the number of nests and the larger the tank must become.

If such an alcohol bath is utilized before dipcoating, it is possible to wait too long—long enough after removal from the alcohol bath to let the molded, paired lens dry completely before immersing it in the liquid hardcoating dipbath. To do so permits airborne particles to deposit onto the cleaned dry lens surfaces, even briefly before entering into the liquid dipbath. Therefore, an optional, but preferred, embodiment for use of the alcohol bath would not allow complete evaporation of the alcohol wet film off the molded paired Rx lens before immersion into the liquid hardcoating dipbath. Instead, wet alcohol films should remain on the lens when immersed into the dipbath, where the lenses are kept for a sufficiently-long residence time so as to remove any remaining wet-film of alcohol (and any airborne particles which may have become entrained therein during the transfer time from alcohol bath to dipcoating bath). Displacing wet-film of alcohol on the lenses' surface with the liquid hardcoating bath is achieved by a combination of high rate of internal circulation of the liquid hardcoating, as well as some programmed-in mechanical motion by the robotic arm holding the lenses to provide agitation and turbulence.

This SCARA-dipping and alcohol-bath approach assumes that the liquid hardcoating bath composition contains at least one or more alcohols in some significant percentage, and that gradual increase during operations within a certain % range of alcohol by dragout of the wet film onto the molded lens will not disrupt desired solvent balance and drydown characteristics of the liquid hardcoating dipbath. Such liquid solvent-based hardcoating compositions ideally suited for this protocol and for use with the SCARA robot will also be of low-to-moderate viscosity (preferrably, <10 centistoke; most preferably, <5 cs.), so as to give efficient mixing/removal of the wet alcohol film off the lens within the dipbath without entraining air bubbles, and to easily flow out smoothly after any vibrations from the SCARA dipping motions. Another way to get smooth coatings from such unconventionally thin viscosity (2–10 cs.) dipbaths is to employ unconventionally fast withdrawal speeds (at least 20 inches per minute, preferrably 0.5–5 inches per second, most preferrably 1–3 inches per second; conventional dipbaths of >10 cs. use 2–12 inches per minute), and to follow the first dip with at least a second dip. In such a preferred fast withdrawal speed double-dip process, the dipbath should be relatively fast-drying (by choosing selected high-evaporation-rate solvents such as low molecular weight alcohols and ketones), so as to give smooth coatings free of coating flow runs or "sags", while using relatively dilute (typically <25% solids) dipbath with a moderate-to-low hardcoating polymer molecular weight.

Depending upon the chosen liquid hardcoating crosslinking chemistry, the curing workstation will be configured so as to provide the desired cure protocol. For example, a simplest version would be a solvent-free UV-curable hardcoating, in which case the curing workstation might simply consist of a battery of UV lamps of the electrodeless type (made by Fusion Systems of Rockville, Md.) or conventional mercury-arc UV lamps, with the lenses having been robotically placed onto carriers of suspended from an overhead conveyor, so as to present the paired, molded lenses' front and back surfaces to line-of-sight exposure to these UV lamps for a sufficiently-long time to effect desired cure. However, doing so may preclude use of the alcohol bath. Another variant of such a configuration would be solvent-based UV cure, in which case a solvent drydown stage would precede the UV-cure-lamp stage (infrared lamps represent an energy-efficient way of devolatilizing such coatings, provided again that the molded, paired Rx lens are presented in line-of-sight orientation to this bank of infrared lamps), to dry both front and back lens surfaces. Then the principles of the above paragraph may apply.

All commercially-desirable heat-curing liquid hardcoats are solvent-based, so inherently a solvent-evaporation/coating-drydown stage must be employed before accelerated heat cure is given. As previously mentioned, if the lens orientation permits line-of-sight exposure to a bank of infrared lamps, doing so is an energy-efficient way of achieving this end. Once fully devolatilized, additional exposure to infrared can provide full crosslinking, or, optionally, a lesser dosage can provide gelation to a sufficiently hard film so as to be "tackfree" (meaning airborne dusts will not permanently stick to such surfaces, so tackfree, hardcoated lenses can safely be handled manually outside the clean-room enclosure without resulting in yield loss due to coating clear specks. Optionally, a tackfree state might be desired in order to re-cycle flawed coated lenses—any inspected lenses which have coating flaws can be easily recycled by immersion into a suitable solvent to strip the tackfree, gelled coating which is not yet fully crosslinked, thus removing the flawed coating film and allowing the paired molded lenses to again be fed through the cleaning and dipcoating protocol.

An optional but preferred embodiment of a curing workstation may employ a rotary indexing table fitted with multiple arms, having either grasping jaws, suction cups or sculptured mechanical nests, adapted for receiving the molded paired Rx lenses that have molded-on hanger tabs. An especially preferred embodiment employs the SCARA robot to precisely place the head of the hanger tab into a substantially mechanically mating geometry (preferably with a tapered lead-angle fit) nest of the type shown in FIG. 3B, and located near the end of each of these arms.

A further optional but preferred embodiment of this special type of curing workstation would then allow for a settable rotation of the arm, such that the position of the molded, paired Rx lens can be varied from a "straight down" vertical orientation (wherein the molded, paired lenses hanging vertically direct down from the arm, at a 90-degree angle), and by rotation of the arm, this angle can be successively reduced to some minimal angle of perhaps 10 degrees or so below the horizontal orientation. (See FIG. 3B, retention step (58)) This optional, but preferred, embodiment has the advantage of employing gravity to create a more uniform coating flowout pattern distributed all across the lens surface. This is believed to be especially important for those Rx lenses having strong plus powers (steep, convex front curved surfaces), and also multi-focal lenses having a ledged bifocal or trifocal segment ("D seg"). Those two types of lenses are particularly problemmatical when the coating is dried and cured in a substantially vertical orientation due to gravity then increasing the nonuniformity of flowout of the liquid hardcoating. Refer to Weber (U.S. Pat. No. 4,443,159) coating patent.

E. Process Flowsheets for Add-On Steps in Continuous-Process, following "Mold and Dipcoat"

In yet another optional but preferred embodiment, after the molded and hardcoated lenses are cured at least to a tackfree state, the lenses are then robotically transferred into an adjoining extension of the same cleanroom enclosure which contains an automated computer-assisted-vision lens inspection system, for cosmetic inspection. See FIG. 4C. Such automated lens inspection machines typically use pattern recognition computer software with a video and/or laser-scanning noncontact inspection, and make comparison of the resulting image against the computer's decision rules for "go" and "no-go" acceptance of any cosmetic flaw deviations. However, such an optical computerized inspection system for cosmetics relies upon high-resolution imagery and a large proportion of all cosmetic rejects are at the surface of the hardcoated lenses ("coating clear specks" and "coating flowout runs", especially). One such manufacturer of Rx FSV lens automated inspection machines is Non-Contact International, of Maumee, Ohio.

Such inspection system in giving desired results (i.e., rejecting bad lenses and accepting good lenses) must not reject "good" lenses which only have a lightly-held dust particle laying loosely on the lens surface. Cleanliness of the lenses coming into the inspection system is the biggest problem in its use so far. Elaborate and costly multi-stage cleaning equipment workstations and protocols have been necessitated to properly use such equipment. A particularly advantegeous combination of the present invention with such machines would employ this mated cleanroom (so the lens never leaves the Class 100 clean air environment) operating with positive pressure without any human operator within that airspace, so that paired tackfree-hardcoated lens are kept in a pristine state as they leave the curing workstation directly to the video inspection station. Cosmetic rejects caught at this tackfree state can then be robotically set aside and recycled through solvent stripping, re-cleaning, and re-dipcoating, as mentioned earlier.

See flowsheet of FIG. 4D. Yet another optional but preferred embodiment of the present invention takes the hardcoated lens to full crosslinked state before leaving the curing workstation, then robotically transfers the molded fully-cured hardcoated paired Rx lens within an adjoining extension of this mated clean-room enclosure maintained under positive pressure (HEPA-filtered air of typically Class 100 purity), wherein this connected-clean-room enclosure contains a thin-film anti-reflective ("AR") vacuum-coating machine fitted with multiple load locks and product workholders adapted to the molded, hardcoated, paired lenses. FIG. 4D shows a block diagram flowsheet of the present invention's steps, within a single cleanroom enclosure (designated by the dashed-line, showing all steps are performed within its cleanroom airspace perimeter). This continuous-process anti-reflective vacuum coating system would typically contain the following steps:

1. After the load station, pull at least a rough vacuum before transferring to a second vacuum stage via load lock, wherein a final vacuum is pulled.
2. At that point, some surface preparation protocol, such as ionizing plasma or electron gun discharge, can be used to clean and/or modify surface chemistry of the top few molecular layers of the hardcoated Rx lens, either in this chamber or in the next chamber connected by load lock.
3. Once such surface preparation is completed, robotic transfer via load lock moves the paired lens into the vacuum-deposition chamber, wherein an AR film is deposited. Preferably, a high-arrival-energy type AR film is deposited by sputtering or by ion-gun-assist, so as to provide a desirably-dense and strongly-adherent coating AR film onto one or both optical surfaces of the hardcoated paired lens.

Such a continuous-process automated-transfer AR-coating machine would be directly analogous to similar machines used by the hundreds for continuous-process aluminum-sputter-coating onto injection-molded polycarbonate compact discs. Leading vacuum-coating equipment manufacturers as Leybold, Balzers, and Denton Vacuum have provided such machines for integrated-molding-and-coating of compact discs (CDs).

What is claimed is:

1. An improved-cleanliness molding process for particulate-minimizing automated ejection of molded pairs of thermoplastic spectacle lenses out of a multi-cavity injection-compression moldset, comprising the steps of:

a.) Forming at least one molded pair of lenses within paired variable-volume mold cavities having a cavity height determined by extendable resilient members in the injection-compression moldset, said mold cavities having optically polished partforming surfaces on opposing paired first side convex inserts and second side concave inserts, said mold cavities being edge-gated along a side quadrant of said lens and in fluid communication with an injection source of molten thermoplastic located substantially equidistant between said mold cavities to form at a parting line a cold sprue and cold runner when allowed to cool, the cold sprue and cold-runner having a mechanical retention on one side of the parting line, with at least one hanger tab per pair of molded lenses extending from said cold sprue and cold runner, and said molded paired lens edges having a drafted surface suited for clean release from bores of said mold cavities;

b.) Cooling said molded paired lenses until the thermoplastic is shape stable;

c.) Ejecting said molded paired lenses by:

i) decreasing mold clamping forces exerted along the parting line until the mold clamping forces are less than a force exerted by said resilient members, so as to extend said resilient members, thereby separating said molded paired lenses from the optically-polished partforming surfaces of the first side convex inserts and creating a release space, before the parting line formed between the first side and the second side separates, ii) pulling said molded paired lenses off the optically-polished partforming surfaces of the second side concave inserts as the parting line begins to separate, while mechanical retaining said molded paired lenses onto the first side, iii) stripping said molded paired lens off the first side mechanical retention, once the moldset is fully open along the parting line, only after an end-of-arm tooling of a takeout robot is in place to receive said molded paired lenses, the takeout robot gripping the paired lenses.

2. An improved-cleanliness molding process for particulate-minimizing automated ejection of molded pairs of thermoplastic spectacle lenses out of a multi-cavity injection moldset within one cleanroom air envelope within which no human operators work, comprising the steps of:

a.) Forming at least one molded paired lenses within paired mold cavities having optically polished part-forming surfaces on opposing paired A side concave inserts and B side convex inserts, said mold cavities being edge-gated along a side quadrant of said lens and in fluid communication with an injection source of molten thermoplastic located substantially equidistant between said mold cavities to form a cold sprue and cold runner therebetween when allowed to cool, the cold sprue and cold-runner having a B side mechanical retention, with at least one hanger tab per pair of molded lenses extending from said cold sprue and cold runner, the hanger tab having a head geometry mated to a robotic device workholder, and said molded paired lens edges having a drafted surface suited for clean release from bores of said mold cavities;

b.) Cooling said molded paired lenses until the thermoplastic is shape stable;

c.) Ejecting said molded paired lenses by i) releasing mold clamping force but not substantially opening the parting line, while separating said molded paired lenses off the optically-polished part-forming surfaces of A side concave inserts with a filtered air blowoff assisted by an edge seal and separating said molded paired lenses off the optically-polished partforming surfaces of B side convex inserts by a filtered air blowoff, with a drafted surface of the lens edge assisting separation off the mold cavity bore surface;

ii) completely opening a parting line and stripping said molded paired lenses off the B side mechanical retention that held them, once the moldset is fully opened up along the parting line and after an end-of-arm tooling of a takeout robot is in place to receive said molded paired lenses while being stripped off of the B side mechanical retention;

d.) removing automatically the end-of-arm tooling of the takeout robot in coordination with clamping motions of the injection molding machine, so the moldset can close and the injection molding machine can start another molding cycle, and the end-of-arm tooling of the takeout robot retracts to at least a second position of travel within said one cleanroom air envelope, wherein at least one robotic transfer takes place so that said molded paired lenses are now gripped by at least a second robotic device at a head on a topmost end of a stem of said hanger tab, and said second robotic device also operating within said one cleanroom air envelope then performs a prescribed dip immersion and withdrawal of said molded paired lenses into and out of a liquid hardcoating solution maintained within a continuously circulating and filtered diptank;

e.) transferring robotically within said one cleanroom air envelope, through a curing workstation wherein any devolatilization of solvent occurs and wherein at least partial cure to a tackfree state is achieved by a chemical crosslinking reaction of the hardcoating;

f.) Transferring said molded paired lenses now hardcoated, out of said one cleanroom air envelope, at which point they can be safely handled by human operators without fear of airborne contamination which could not be removed by cleaning or wiping.

3. A process of claim 2 wherein an additional step of robotic transfer of immersion within a circulating filtered alcohol bath for a predetermined length of time takes place after the ejecting steps but before the dip immersion and withdrawal step.

4. A process of claim 3 wherein said prescribed dip immersion and withdrawal of said molded paired lenses into and out of a liquid hardcoating solution is to a liquid level at least higher than the topmost lens edge surface of said paired lens but below the head on the topmost end of the stem of the hanger tab, thereby avoiding liquid dipbath contact with gripping means of the second robotic device.

5. A process of claim 2 wherein said head at topmost gripping position of said hanger tab is inserted by the second robotic device into a tapered lead-angle aperture, for positive retention as a molded plastic spring therein by means of an open-end horseshoe shape with retention detents on each of two legs which can be deflected into a narrower shape when squeezed together or pushed in insertion.

6. A process of claim 2 wherein said head at topmost gripping position of said hanger tab is handed off by the second robotic device into a workholder nest which retains said molded paired lens therein by gravity, by means of said head joining to the stem in a transition from wide to narrow in a tapered lead-angle geometry which by design is mated to the workholder nest having substantially mirror-image geometry of slightly greater lead angle taper, in the automated transfers from molding to alcohol bath to hardcoating dipbath to curing workstation.

7. A process of claim 2 wherein said spectacle lenses are for vision correction, and wherein the thermoplastic of said spectacle lenses is polycarbonate.

* * * * *